US010944711B2

(12) United States Patent
Simpson et al.

(10) Patent No.: US 10,944,711 B2
(45) Date of Patent: Mar. 9, 2021

(54) PAGINATED METHOD TO CREATE DECISION TREE CONVERSATION

(71) Applicant: Microsoft Technology Licensing, LLC, Redmond, WA (US)

(72) Inventors: Kevin T. Simpson, San Francisco, CA (US); Adella L. Guo, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/368,570

(22) Filed: Mar. 28, 2019

(65) Prior Publication Data

US 2020/0314050 A1 Oct. 1, 2020

(51) Int. Cl.
*H04L 12/00* (2006.01)
*H04L 12/58* (2006.01)
*G06F 16/955* (2019.01)

(52) U.S. Cl.
CPC ............ *H04L 51/22* (2013.01); *G06F 16/955* (2019.01); *H04L 51/16* (2013.01)

(58) Field of Classification Search
CPC ..... G06F 15/16; G06F 3/04817; H04L 67/00; H04L 51/00; H04L 51/04; H04N 21/440263; G06Q 10/107
USPC ................................ 709/204, 205, 206, 207
See application file for complete search history.

(56) References Cited

U.S. PATENT DOCUMENTS

| 6,185,591 B1 * | 2/2001 | Baker .................... G06F 40/166 715/210 |
| 7,475,110 B2 * | 1/2009 | Kirkland ................. H04L 51/04 709/204 |
| 7,479,949 B2 * | 1/2009 | Jobs .................. H04M 1/72552 345/173 |
| 7,725,538 B2 * | 5/2010 | Kirkland ................. H04L 51/16 709/204 |
| 7,769,144 B2 * | 8/2010 | Yao ....................... G06Q 10/107 379/88.11 |
| 7,827,483 B2 * | 11/2010 | Unbedacht ............ G06F 40/177 715/256 |
| 8,108,464 B1 * | 1/2012 | Rochelle ............. G06F 3/04842 709/205 |
| 8,291,019 B1 * | 10/2012 | Rochelle ............. G06F 3/04842 709/205 |

(Continued)

*Primary Examiner* — Frantz Coby
(74) *Attorney, Agent, or Firm* — Hickman Becker Bingham Ledesma LLP; Daniel D. Ledesma

(57) ABSTRACT

Techniques for creating a conversation tree are provided. In one technique, a user interface comprises an editor portion and a preview portion. The editor portion includes elements for creating and editing messages in the conversation tree. The preview portion includes a first message that comprises multiple buttons. Input is received, through the user interface, that selects a first button of the first message. In response to receiving the input, the preview portion to be updated to include a different set of messages. In a related technique, the preview portion includes a first message and a second message that is a child of the first message. Input is received, through the user interface, that selects the first message, causing the preview portion to be updated to exclude the second message and retain the first message, and causing the editor portion to be updated to include information about the first message.

20 Claims, 23 Drawing Sheets

(56) References Cited

U.S. PATENT DOCUMENTS

| | | | | |
|---|---|---|---|---|
| 8,413,054 | B2* | 4/2013 | Kaplan | G11B 27/034 |
| | | | | 715/719 |
| 8,510,399 | B1* | 8/2013 | Byttow | G06Q 10/10 |
| | | | | 707/770 |
| 8,527,602 | B1* | 9/2013 | Rasmussen | H04N 21/440263 |
| | | | | 709/207 |
| 8,700,776 | B2* | 4/2014 | Rasmussen | G06Q 10/107 |
| | | | | 709/204 |
| 9,059,953 | B2* | 6/2015 | Shmunis | H04N 1/00411 |
| 9,166,939 | B2* | 10/2015 | Rasmussen | H04N 21/440263 |
| 9,256,587 | B2* | 2/2016 | Haggart | G06F 3/0482 |
| 9,429,752 | B2* | 8/2016 | Schowengerdt | G02B 27/0172 |
| 9,693,019 | B1* | 6/2017 | Fluhr | H04L 65/4076 |
| 2010/0223345 | A1* | 9/2010 | Gupta | H04L 51/046 |
| | | | | 709/206 |
| 2012/0079375 | A1* | 3/2012 | Ogino | G06K 15/1867 |
| | | | | 715/274 |
| 2012/0246565 | A1* | 9/2012 | Kumamoto | G06F 8/38 |
| | | | | 715/273 |
| 2013/0055087 | A1* | 2/2013 | Flint | G06F 3/04883 |
| | | | | 715/723 |
| 2014/0118474 | A1* | 5/2014 | Fluhr | H04N 7/152 |
| | | | | 348/14.09 |
| 2014/0372844 | A1* | 12/2014 | Zumkhawala | G06F 40/166 |
| | | | | 715/204 |
| 2016/0224517 | A1* | 8/2016 | Horn | G06F 40/18 |
| 2017/0220212 | A1* | 8/2017 | Yang | H04L 51/22 |
| 2017/0336959 | A1* | 11/2017 | Chaudhri | G06F 3/04817 |

* cited by examiner

1810
DISPLAY A CONVERSATION DESIGN INTERFACE (CDUI) THAT COMPRISES AN EDITOR PORTION AND PREVIEW PORTION THAT INCLUDES A PREVIEW OF EACH MESSAGE OF A STRICT SUBSET OF MESSAGES THAT HAVE BEEN CREATED FOR A CONTENT DELIVERY CAMPAIGN

1820
RECEIVE, THROUGH THE CDUI, FIRST INPUT THAT SELECTS A BUTTON IN A FIRST MESSAGE IN THE FIRST STRICT SUBSET

1830
IN RESPONSE TO RECEIVING THE FIRST INPUT, UPDATING THE PREVIEW PORTION TO INCLUDE A SECOND STRICT SUBSET THAT IS SEPARATE FROM THE FIRST STRICT SUBSET

1840
IN RESPONSE TO RECEIVING THE FIRST INPUT, UPDATE THE EDITOR PORTION TO INCLUDE A SET OF UI ELEMENTS FOR EDITING A SECOND MESSAGE THAT IS ASSOCIATED WITH THE BUTTON

1850
RECEIVE, THROUGH THE CDUI, SECOND INPUT THAT SELECTS AN ADD BUTTON OPTION PRESENTED IN THE EDITOR PORTION

1860
IN RESPONSE TO RECEIVING THE SECOND INPUT, UPDATE THE EDITOR PORTION TO INCLUDE A SET OF UI ELEMENTS FOR CREATING A BUTTON FOR THE SECOND MESSAGE

1870
IN RESPONSE TO RECEIVING THE SECOND INPUT, UPDATE THE PREVIEW PORTION TO INCLUDE THE BUTTON IN THE SECOND MESSAGE

1910
PRESENT A CONVERSATION DESIGN INTERFACE (CDUI) THAT COMPRISES AN EDITOR PORTION AND PREVIEW PORTION THAT INCLUDES A FIRST MESSAGE AND A SECOND MESSAGE THAT IS A CHILD OF THE FIRST MESSAGE

1920
RECEIVE, THROUGH THE CDUI, INPUT THAT SELECTS A BUTTON IN THE FIRST MESSAGE

1930
IN RESPONSE TO RECEIVING THE INPUT, UPDATE THE PREVIEW PORTION TO EXCLUDE THE SECOND MESSAGE BUT RETAIN THE FIRST MESSAGE

1940
IN RESPONSE TO RECEIVING THE INPUT, UPDATE THE EDITOR PORTION TO INCLUDE INFORMATION ABOUT THE FIRST MESSAGE

1950
RECEIVE, THROUGH THE CDUI, SECOND INPUT THAT SELECTS AN ADD BUTTON OPTION PRESENTED IN THE EDITOR PORTION

1960
IN RESPONSE TO RECEIVING THE SECOND INPUT, UPDATE THE EDITOR PORTION TO INCLUDE A SET OF UI ELEMENTS FOR CREATING A BUTTON FOR THE SECOND MESSAGE

1970
IN RESPONSE TO RECEIVING THE SECOND INPUT, UPDATE THE PREVIEW PORTION TO INCLUDE THE BUTTON IN THE SECOND MESSAGE

*FIG. 19*

PAGINATED METHOD TO CREATE DECISION TREE CONVERSATION

RELATED APPLICATIONS

This application is related to U.S. patent application Ser. No. 16/147,239, filed Sep. 28, 2018, the entire contents of which is hereby incorporated by reference as if fully set forth herein.

TECHNICAL FIELD

The present disclosure relates to electronic communications and, more particularly, to, scalable creation of automated conversations over a computer network.

BACKGROUND

The Internet has enabled the delivery of electronic content to billions of people. Such delivery can be made through many different publisher systems, including online applications that provide space for online content provider systems to publish online content for end-users. For that reason, some entities maintain online content delivery exchange systems that allow different content provider systems to reach a wide online audience through different publishing platforms. If an end-user uses a computing device to interact with online content from a content provider system, then the computing device may be directed to the content provider system.

However, relatively few end-users actually interact with online content from different content provider systems. Furthermore, once end-users are directed to a content provider system, the digital environment thereof may be unfamiliar, causing end-users to cease interacting with the content provider system. The only way for the end-users to be reminded of their online visit to a content provider system is if they are presented again with online content through one or more third-party publishing systems, which is a low probability event. For these reasons, relying on end-users to click on online content is a relatively ineffective way to digitally reach out to end-users.

An approach for improving computer-related technology through offering a scalable solution for content providers to allow end users to automatically interact with their respective content in a secure way is described in U.S. patent application Ser. No. 16/147,239. That approach relies on creating decision trees. However, creating those decision trees has been a difficult and time-consuming task, requiring many hours of labor on the part of representatives of a content delivery system working with representatives of a content provider. Such creation has not been scalable or easy to follow.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2-8, 9A, and 10-15 are screenshots of example conversation design user interfaces, in an embodiment;

FIGS. 18-19 are flow diagrams of example processes for updating different portions of a conversation design user interface, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A system and method for creating an automated conversation with end-users are provided. The automated conversation includes decision tree logic. In one technique, a user interface for constructing the conversation includes (1) an editing portion for editing one message in the conversation at a time and (2) a preview portion that displays a preview of messages that an end-user would see given the currently-edited message. Thus, a visual tree representation of the conversation tree is not required. This simultaneous editing and preview mode is easier for authors to interact with in order to create the conversation.

Thus, embodiments improve computer-related technology by allowing designers to create conversation trees in an intuitive and user-friendly way. Through a unique user interface, designers of a conversation tree are able to see what an end-user would see in their message inbox given a currently-edited message, even though the user interface might only allow one message to be edited at a time.

System Overview

Figure 1:
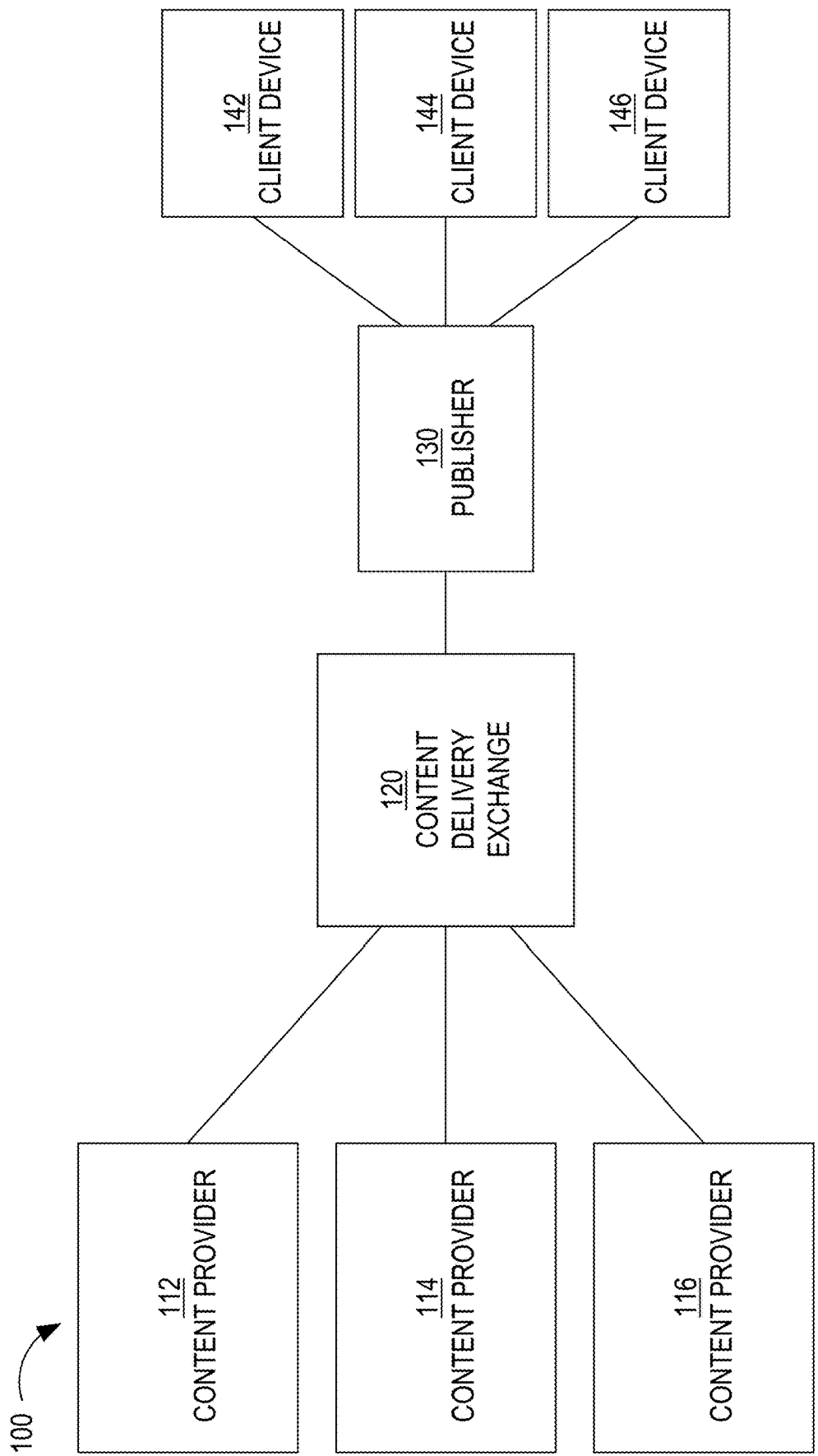
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM, which specifically means cost per one thousand impressions). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or a interaction data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

Conversation User Interface

A conversation design user interface provided by content provider interface 122 includes an editor portion and a preview portion. The editor portion includes user interface (UI) elements for creating and editing messages and buttons while the preview portion includes a preview of one or more messages that have been created previously. The messages presented in the preview portion are what a user would see in his/her message inbox after engaging with a content item that corresponds to content delivery campaign that comprises a conversation tree. Thus, the preview portion is designed based on what a user/member would experience. For example, a user/member would see a set of one or more messages in his/her message inbox maintained for the user. If the messages in a conversation are displayed vertically to the user in a particular order in the message inbox, then the preview portion presents the messages vertically and in the same order. Because a user can only take one branch through a conversation tree, the preview portion may only include a strict subset of messages that exist for the conversation tree.

The interaction model embodied in the editor portion and the preview portion is paginated instead of simply a repository of messages, where all messages are displayed simultaneously. While all messages in a conversation tree are eventually reachable through the conversation design user interface, the interaction model allows the conversation tree designer to view and edit only one message at a time. The preview portion displays that currently-editable message (and any updates to that message) along with any other "ancestor" messages (such as a parent message, a grandparent message) of that message, as depicted in some of the following examples.

Figure 2:
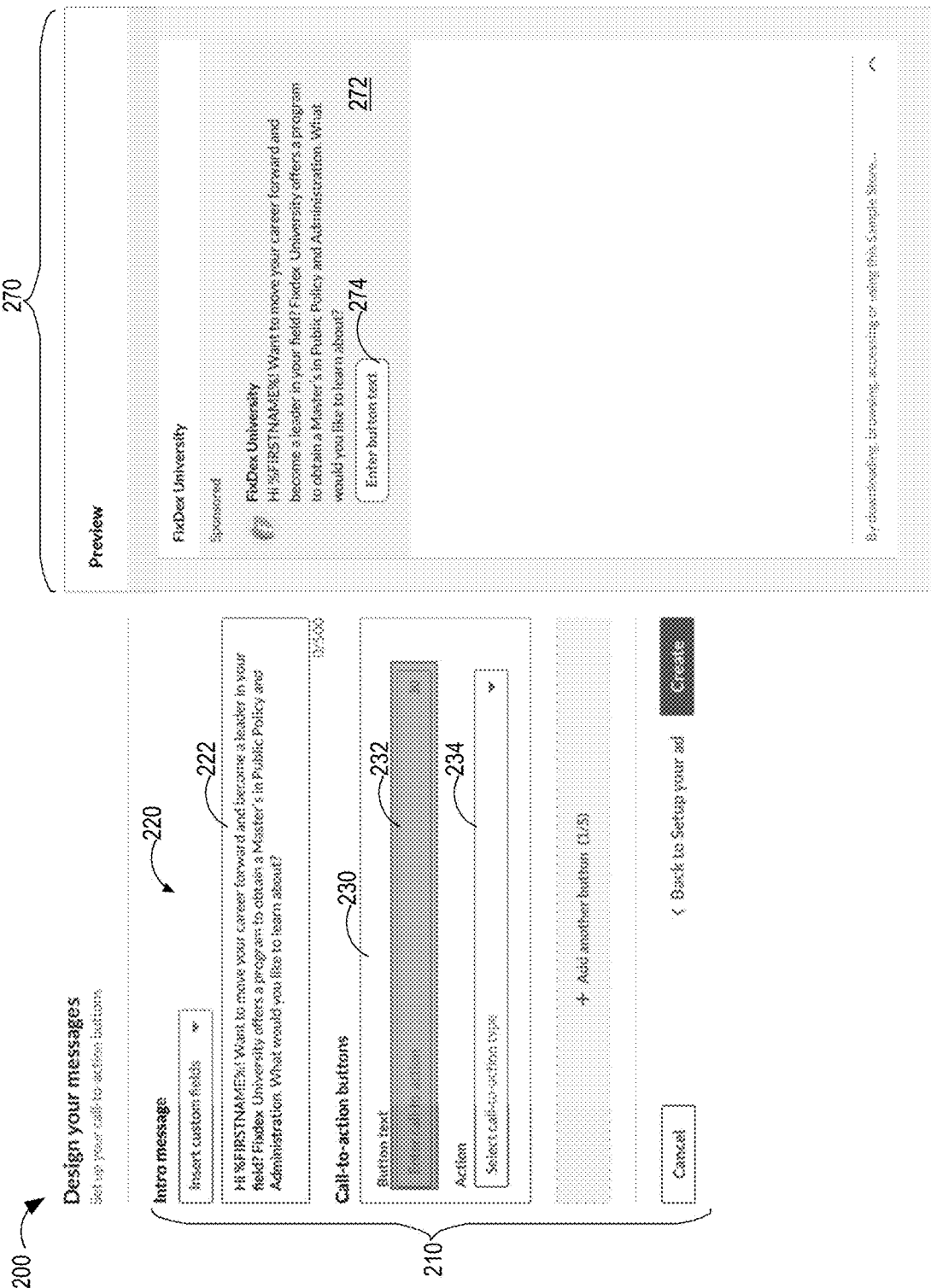

FIG. 2 is a screenshot of an example conversation design user interface 200, in an embodiment. CDUI 200 includes an editor portion 210 and a preview portion 270. Editor portion 210 includes a message section 220 for creating an introduction message 272 (which acts as the "root" message of the conversation tree) and a button section 230 for editing a button 274. Message section 220 includes a text input field 222 for inserting text that will be used to update introduction message 272.

Button section 230 includes a button text field 232 for inserting text that will be used to update button 274 and an action field 234 for associating an action with button 274. Selecting action field 234 may cause a drop-down menu to appear that includes multiple selectable options, each corresponding to a different action. Examples of different (e.g., pre-defined) actions include showing the next message in the conversation tree, sending the user (who selects button 274 when the button is "live") to a particular website (which may be remote from content delivery system 120 and from publisher system 130), and opening a lead generation form hosted by content delivery system 120.

Each input received through a CDUI may be recorded in a backend database (not depicted) that is accessible to content delivery system 120. A conversation tree stored in the database is stored in association with a content provider whose representative created the conversation tree. Each created message in the conversation tree may have a message identifier that is unique relative to other messages in the conversation tree. Each "complete" message includes text while each non-complete message does not include any text. Each created button in the conversation tree may have a button identifier that is unique relative to other buttons in the conversation tree. Each "complete" button includes text while each non-complete button does not include any text. Each button is associated with (1) a first message identifier that identifies a message to which the button belongs and, optionally, (2) a second message identifier that identifies a message that is to be displayed if the button is selected. Instead of a second message identifier, a button may be associated with a URL of a third-party resource (e.g., a website) or resource locator that points to locally-hosted resource, such as a form. Based on a set of messages and a set of buttons that connect the messages, a conversation tree may be visualized and leveraged to present a pre-defined set of messages to end-users at scale.

Figure 3:
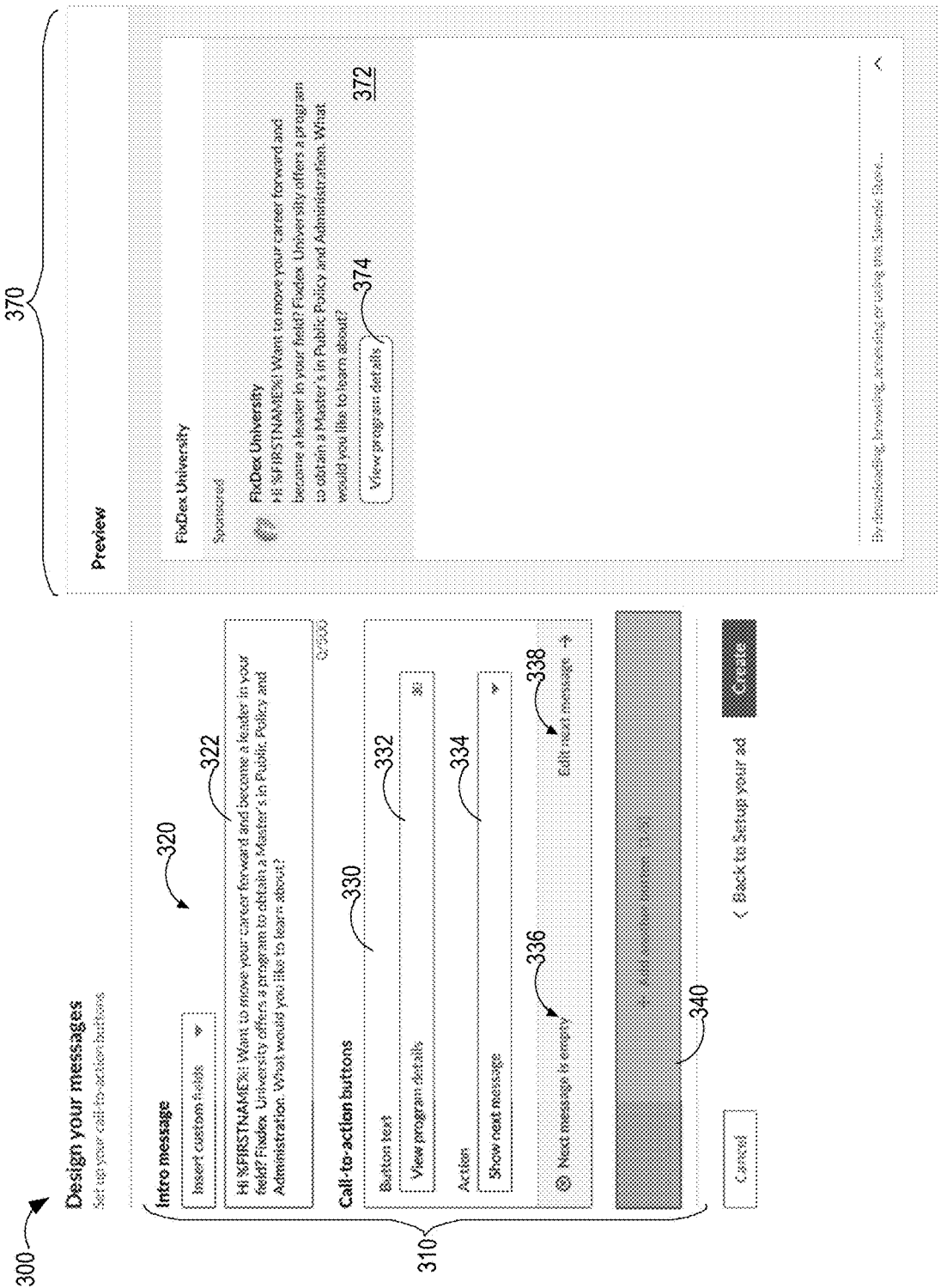

FIG. 3 is a screenshot of an example conversation design user interface 300, in an embodiment. CDUI 300 is similar to CDUI 200 except that text for button 274 has been added and a particular action has been selected, causing preview portion 270 to be updated. Text that is added to button text field 332 includes "View program details," which now appears in preview portion 370.

Action field 334 includes an option ("Show next message") that was selected. In response to selecting the option, CDUI 300 is updated to include a warning 336 that indicates that the next message (that is or will be associated with button 274) is empty. Also, CDUI 300 is updated to include an edit message invitation 338 to edit that next message, whose content has not yet been created through editor portion 310.

Editor Portion: Add Button

CDUI 300 includes an add button option 340 that, when selected, causes editor portion 310 to be updated. Add button option 340 includes text that indicates one of five buttons have been created. In this example, each message (or just the root message) has a maximum number of buttons that may be included in the message. Other embodiments include a higher or lower maximum or no maximum on the number of buttons per message.

Figure 4:
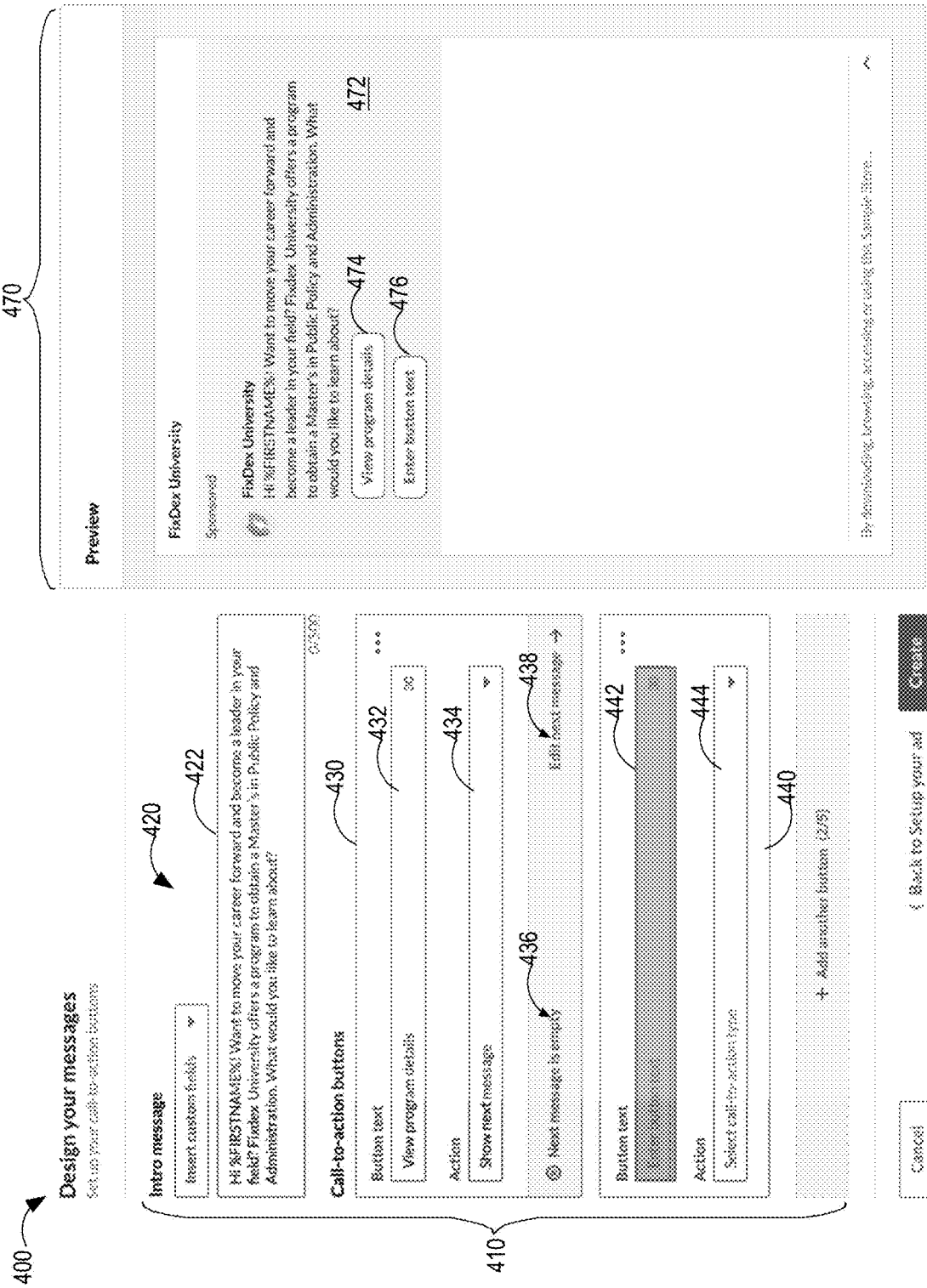

FIG. 4 is a screenshot of an example CDUI 400, in an embodiment. CDUI 400 is presented in response to selection of add button option 340. CDUI 400 is similar to CDUI 300 except that CDUI 400 includes two button sections 430 and 440 and preview portion 470 is updated to include a button 456. Button section 430 corresponds to button section 230. Like button section 430, button section 440 includes a button text field 442 for inserting text that will be used to update button 476 and an action field 444 for associating an action with button 476.

Editor Portion: Edit Message

Figure 5:
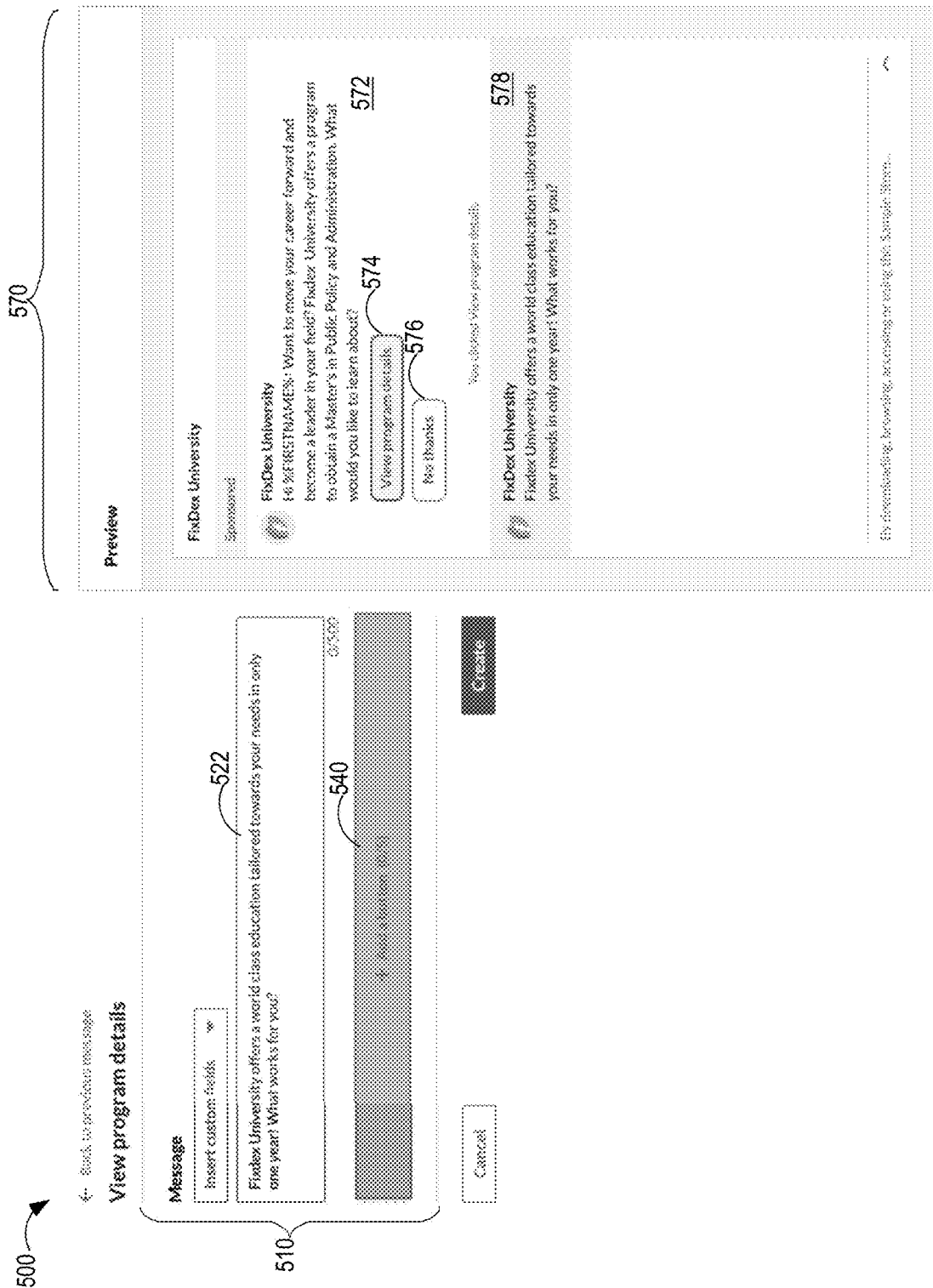

FIG. 5 is a screenshot of an example CDUI 500, in an embodiment. CDUI 500 is presented in response to selection of button 474 or edit message invitation 438. CDUI 500 is similar to CDUI 400 except that CDUI 500 includes no button sections in editor portion 510 and preview portion 570 is updated to include another message 578, along with introduction message 572, which corresponds to introduction message 272. In this example, text has been added to input text field 522 and, in response, is automatically added to message 578.

While editor portion 510 includes UI elements for editing message 578, button 574 (which points to or is associated with message 578) is highlighted in preview portion 570.

Editor portion 510 includes an add button option 540 (similar to add button option 340) that, when selected, causes editor portion 510 to be updated. Add button option 540 includes text that indicates zero have been created for message 578 and that five buttons are available for message 578.

Figure 6:
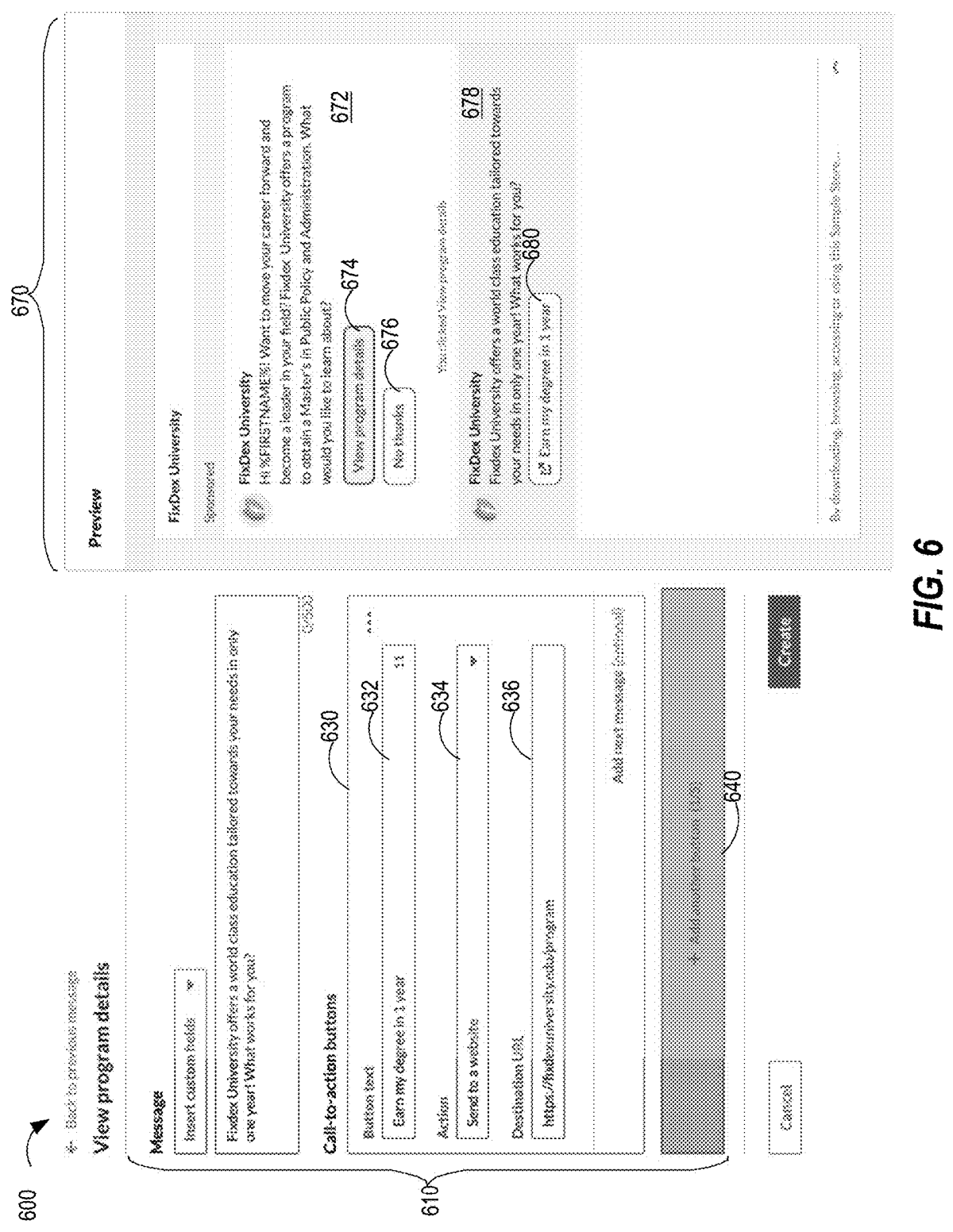

FIG. 6 is a screenshot of an example CDUI 600, in an embodiment. A version of CDUI 600 is presented in response to selection of add button option 540. CDUI 600 is similar to CDUI 600 except that CDUI 600 includes a button section 630 and a new button 680, which is part of message 678. Button section 630 includes a button text field 632 for inserting text that will be used to update new button 670, an action field 634 for associating an action with new button 660, and a destination URL field 636. In this example, text (i.e., "Earn my degree in 1 year") has been entered through button text field 632, which causes new button 660 to be updated. Also, an action has been selected (i.e., "Send to a website"), which causes destination URL field 636 to appear. Also, text of a particular uniform resource locator (URL) has been entered into destination URL field 636. Also, new button 680 is updated to include an icon that indicates that user selection of the button will cause a browser to request content from a remote website. Thus, prior to entering of the text in destination URL field 636, new button 680 might not include that icon.

Figure 7:
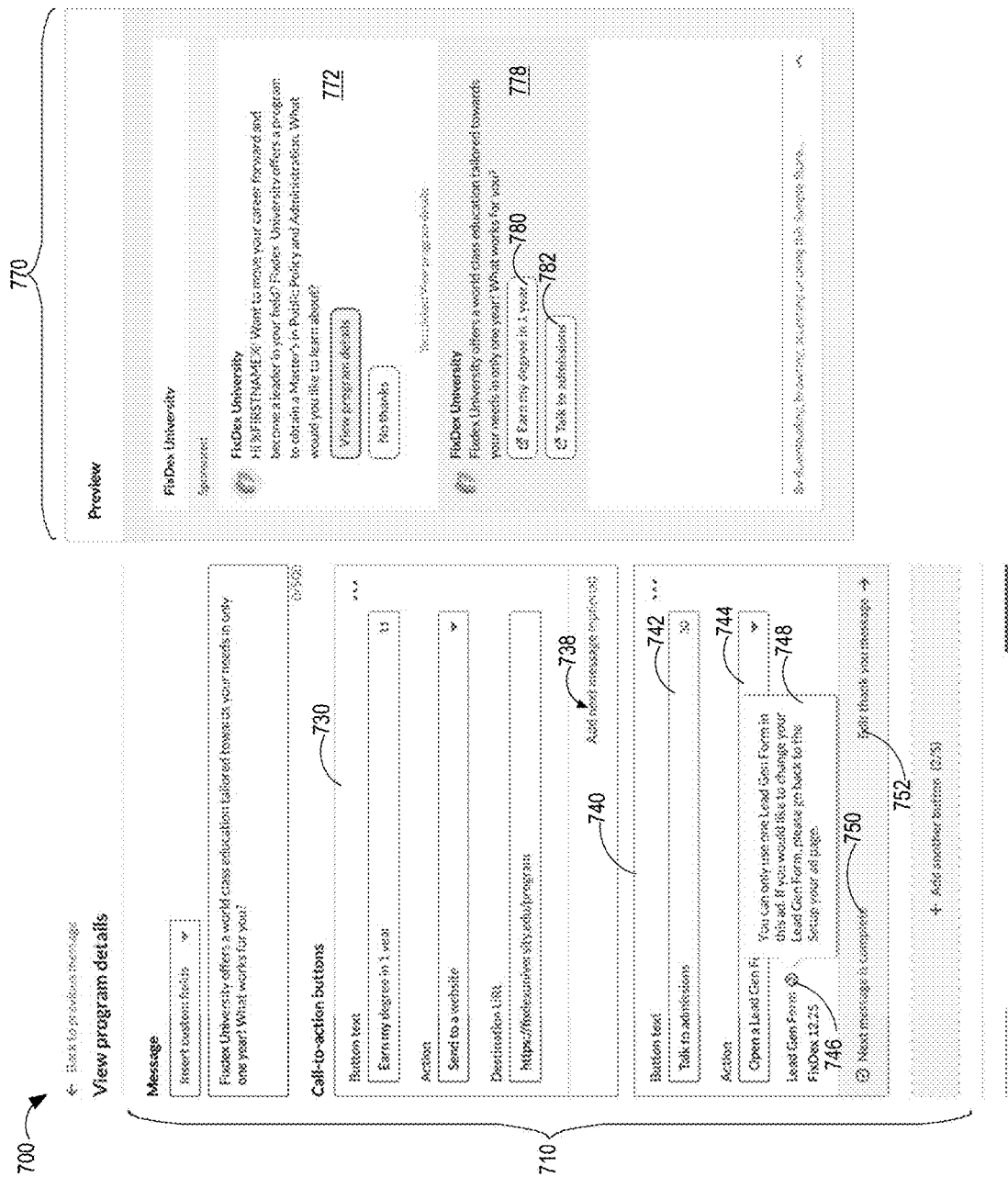

CDUI 600 includes an add button option 640 that, when selected, causes editor portion 610 to be updated. Add button option 640 includes text that indicates one of five buttons have been created for message 678. User selection of add button option 640 causes CDUI 600 to be updated to CDUI 700, depicted in FIG. 7.

CDUI 700 includes a button section 740 that a button text field 742 for inserting text that will be used to update new button 782 and an action field 744 for associating an action with new button 782. In this example, text (i.e., "Talk to admissions") has been entered through button text field 742, which causes new button 782 to be updated. Also, a pre-defined action has been selected (i.e., "Open a Lead Gen Form"), which causes an icon 746 to be displayed. User selection of icon 746 causes a notice 748 to be displayed, which states that only one lead generation form may be used for the conversation tree.

Button section 740 also includes a message notification 750 that is displayed in response to selection of the pre-defined action. Message notification 750 indicates that the message associated with new button 782 is complete. In this example, if the lead generation form was not complete, then message notification 750 would have indicated that the message is not complete. The message associated with new button 782 may be the lead generation form itself.

Button section 740 also includes an edit message invitation 752 that is displayed in response to selection of the pre-defined action. Edit message invitation 752 invites the user to edit a thank you message, which may be a default thank you message defined by content delivery system 120.

Navigatable Buttons in Preview

Figure 8:
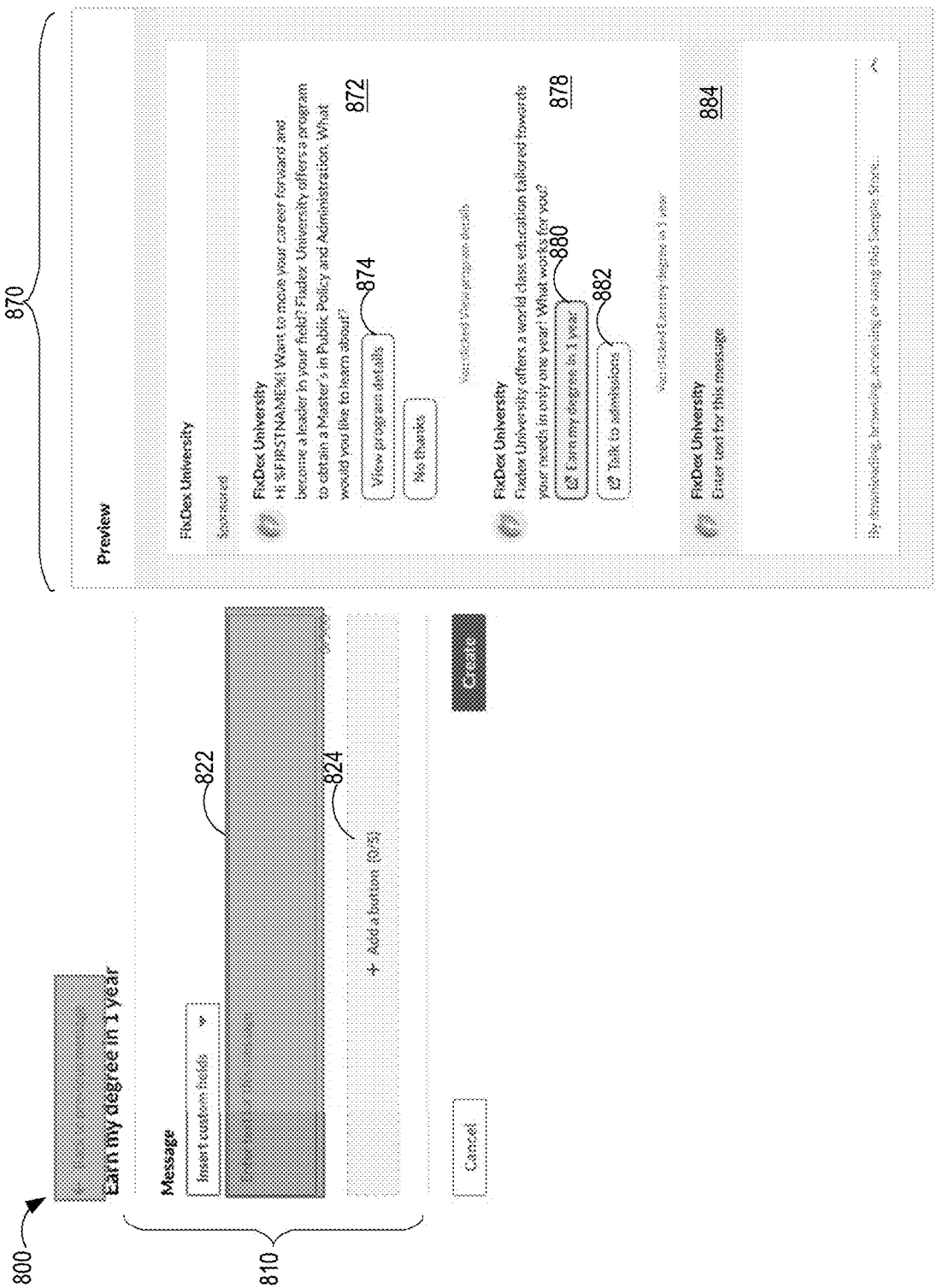

Button section 730 includes an add next message invitation 738. User selection of add next message invitation 738 causes CDUI 700 to be updated to CDUI 800 depicted in FIG. 8. Additionally or alternatively, user selection of button 780 causes CDUI 700 to be updated to CDUI 800. Thus, buttons in the preview portion of a conversation design user interface may be navigatable. User selection of add next message invitation 738 or of button 780 causes a new message 884 to be created in preview portion 870.

Figure 9A:
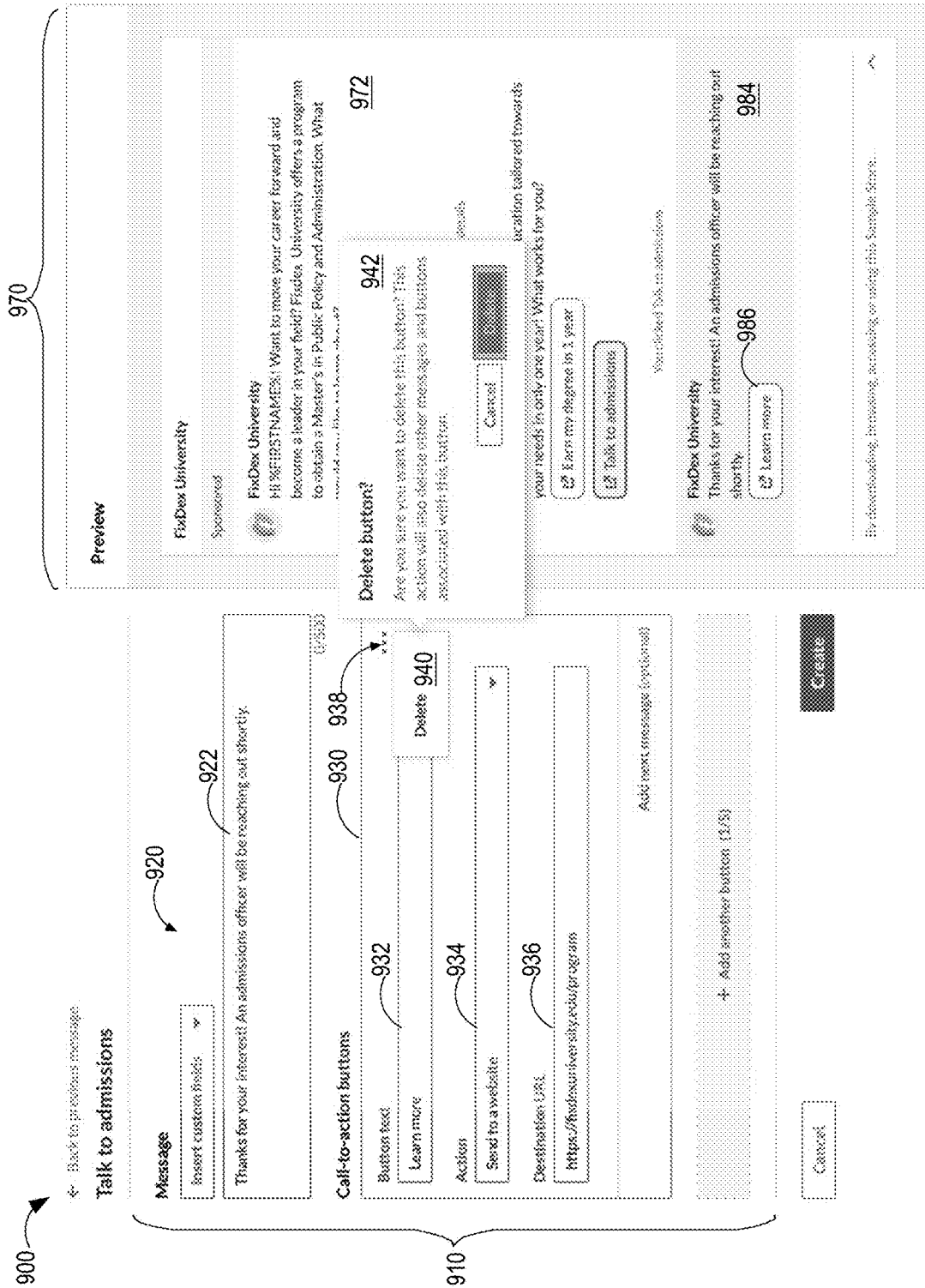

CDUI 800 also includes an editor portion 810. Editor portion 810 is different than editor portion 710 in that editor portion 810 includes UI elements for creating and editing a new message 884, such as a text input field 822 for inserting text that will be used to update message 884 and an add button option 824. However, in this example, button 874 (which corresponds to button 274) that, when selected, causes editor portion 810 to be updated to CDUI 700, except without notice 748. From there, either edit message invitation 752 is selected or button 782 is selected, which causes CDUI 900 to be presented, as depicted in FIG. 9A.

Editor portion 910 of CDUI 900 includes a message section 920 for creating a "grandchild" message 984 (with respect to introduction message 972, which corresponds to introduction message 272) and a button section 930 for editing a button 986 that is included in message 984. Message section 920 includes a text input field 922 for inserting text that will be used to update message 984.

Button section 930 includes a button text field 932 for inserting text that will be used to update button 986 and an action field 934 for associating an action with button 986. Selecting action field 934 may cause a drop-down menu to appear that includes multiple selectable options, each corresponding to a different action. In this example, the pre-defined action "Send to a website" was selected, which causes destination URL field 936 to be displayed. In this example, text was entered in destination URL field 936.

Deleting Buttons

Button section 930 also includes a button option 938 that, when selected, causes a delete button 940 to appear, which button is selectable by the user/designer. Selection of delete button 940 causes a warning message 942 to be presented. Warning message 942 indicates that deleting the corresponding button (i.e., 986 in this example) will cause messages and buttons associated with button 986 to be deleted also. In this example, because there are no messages that button 986 points to, no messages or other buttons will be deleted if the delete button in warning message 942 is selected. Instead, selection of that delete button causes CDUI 1000 to be displayed. CDUI 1000 is similar to CDUI 900 except without button section 930 and without button 986.

Figure 9B:
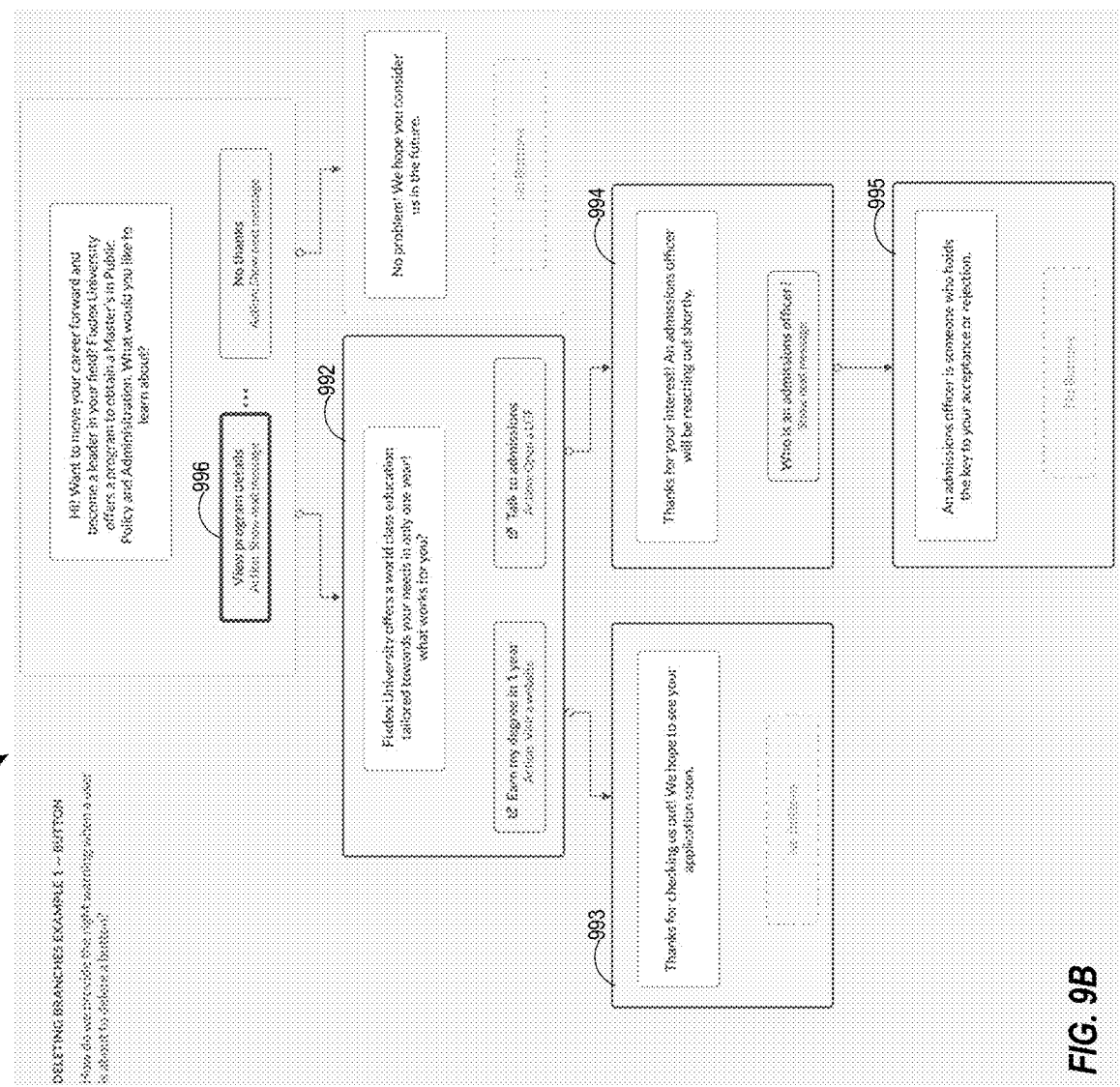
FIG. 9B is an example conversation tree that depicts an effect that deleting a button has on the conversation tree, in an embodiment.
Figure 10:
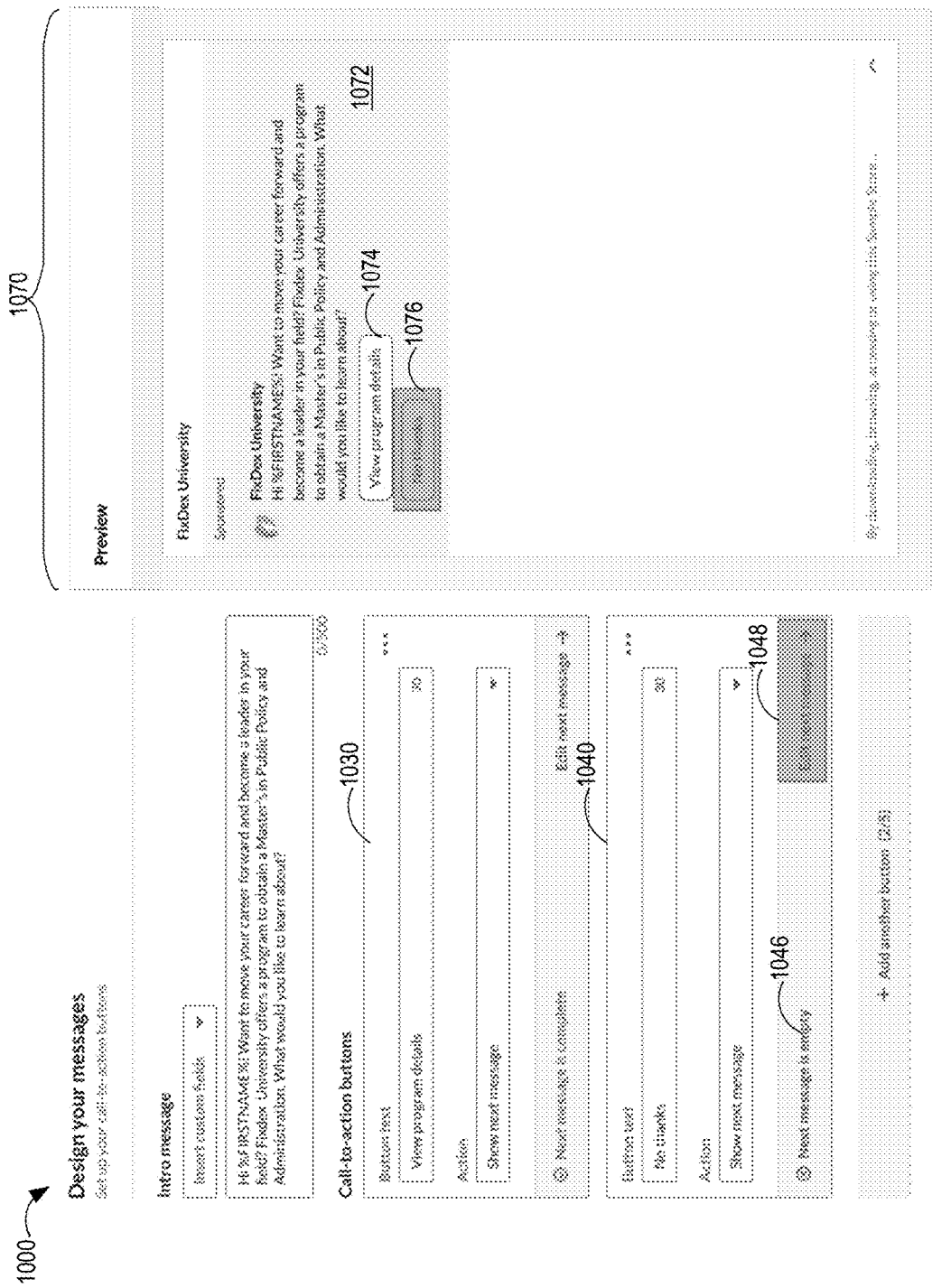
Figure 11:
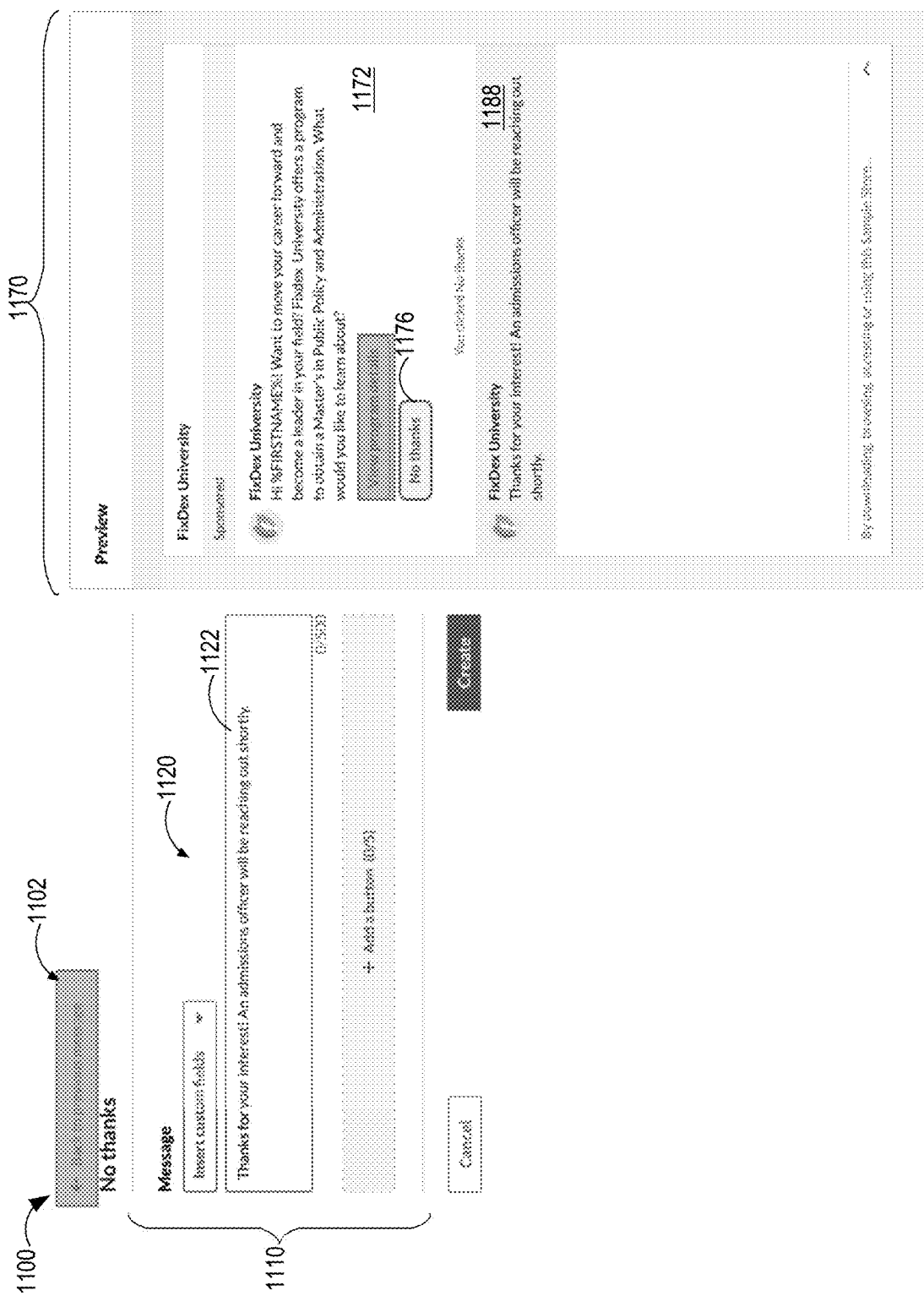
Figure 12:
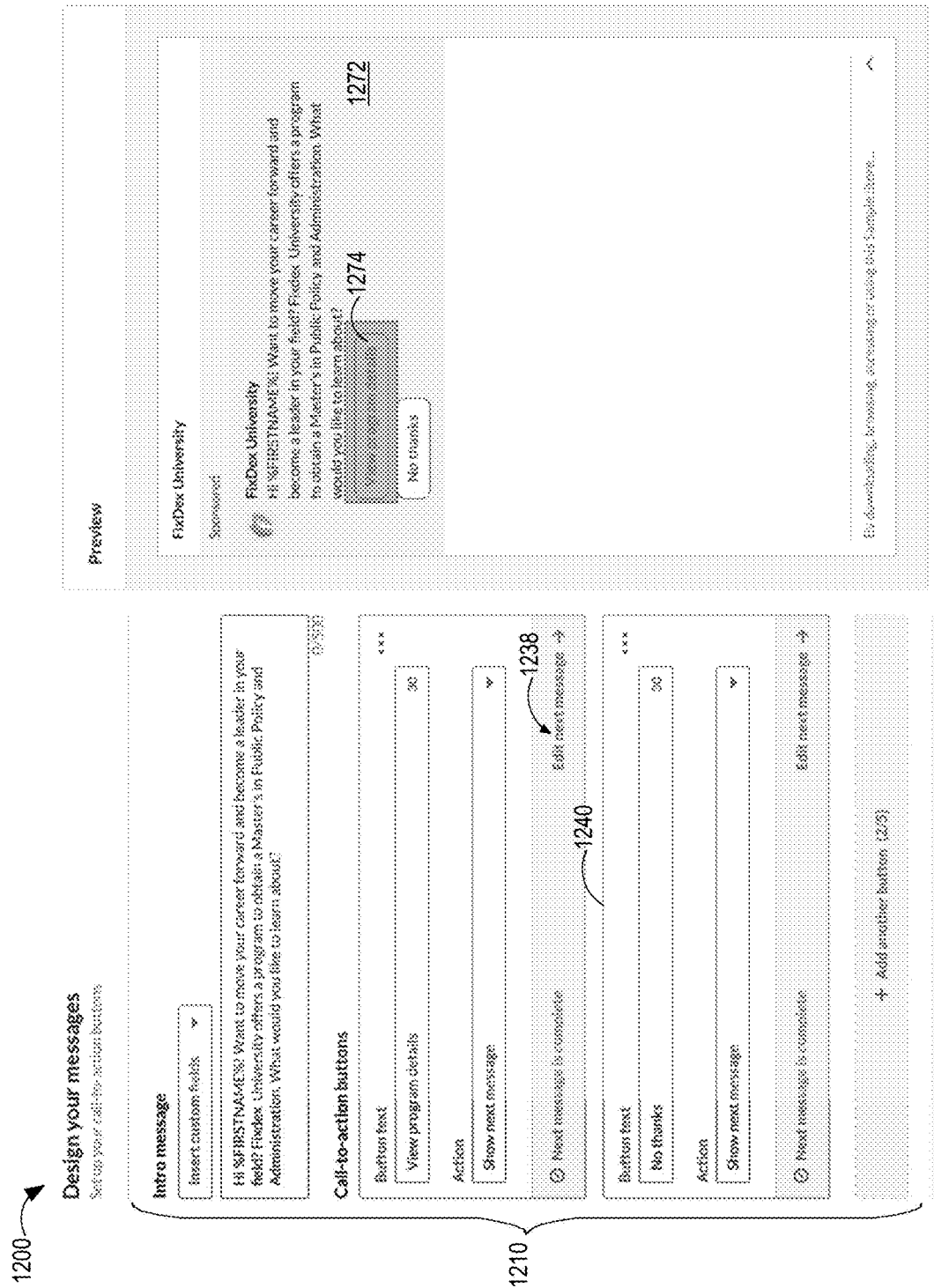
Figure 13:
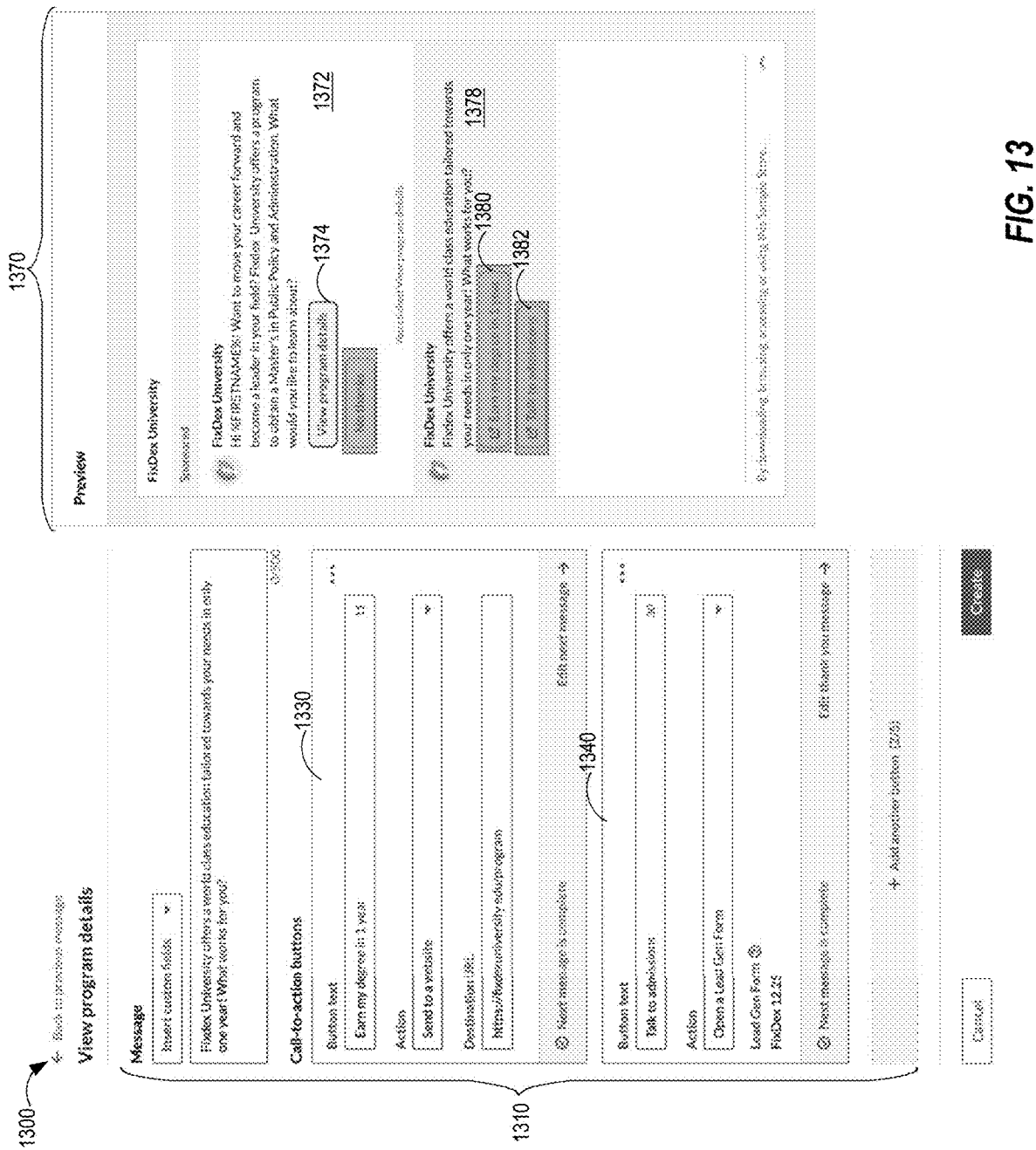
Figure 14:
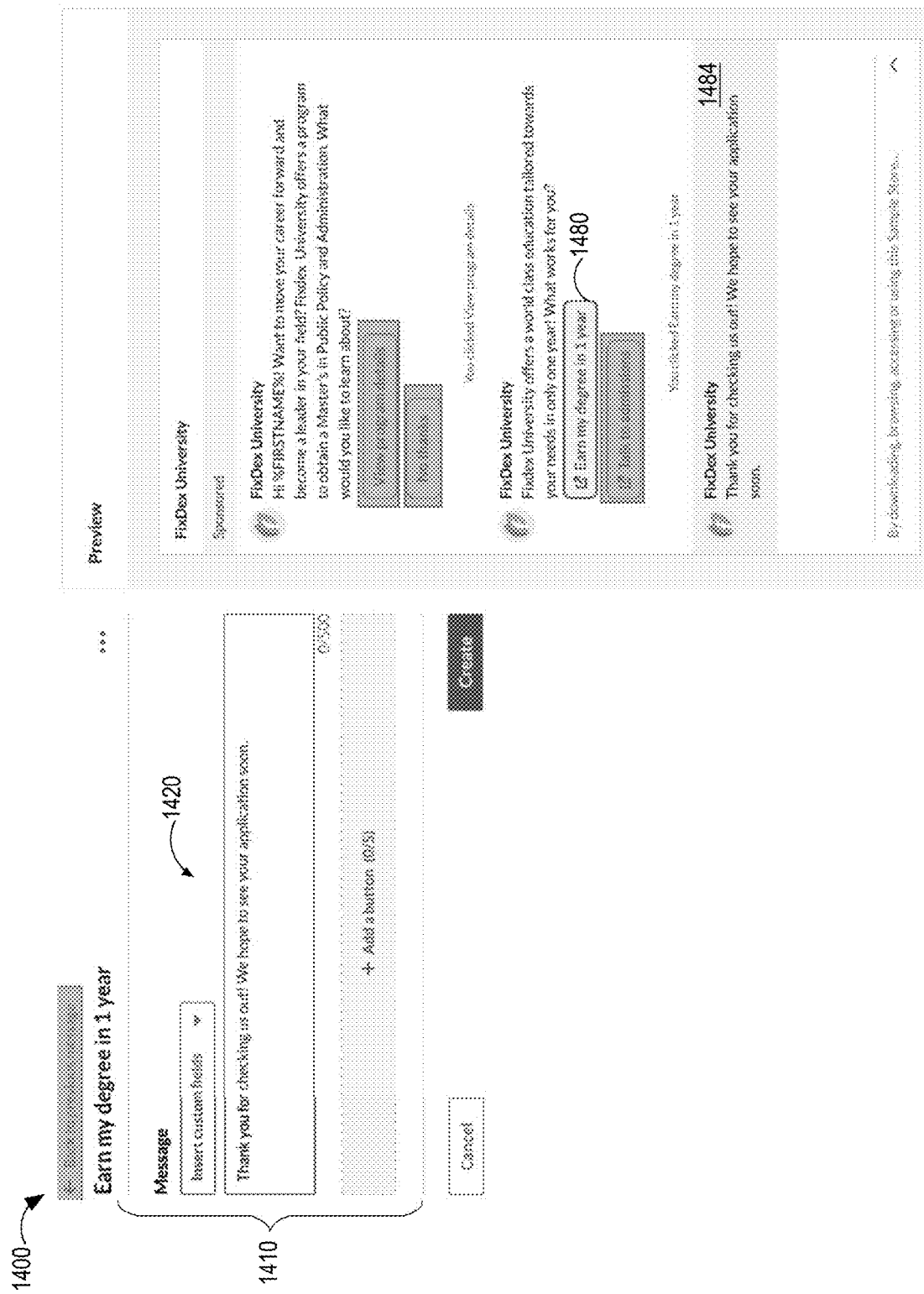
Figure 15:
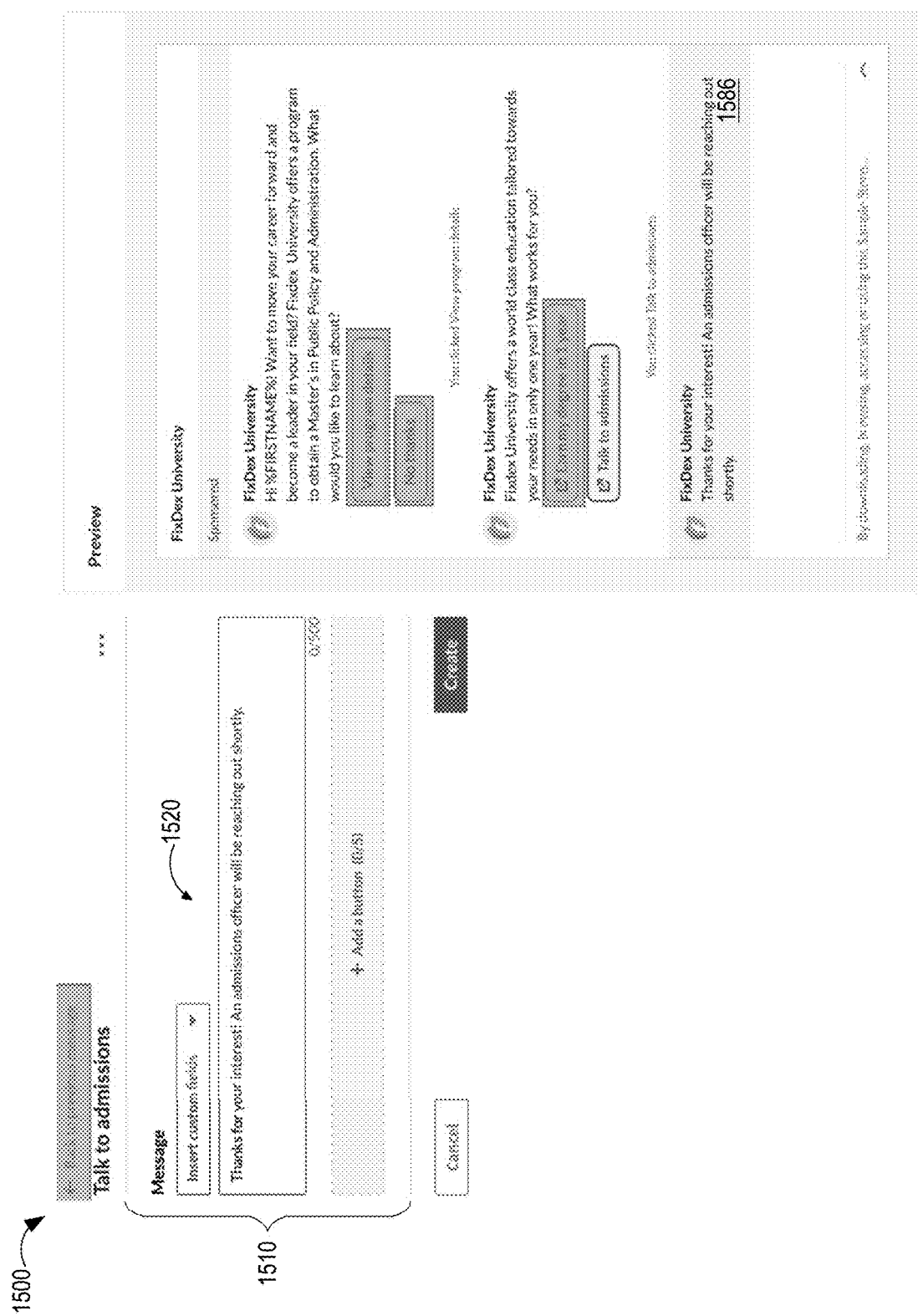

FIG. 9B is a block diagram that depicts a conversation tree 990 and a set of messages 992-995 in conversation tree 990 that would be deleted if a button 996 is deleted. Conversation tree 990 may or may not be constructed and displayed to a user in response to input, received through a conversation design user interface, to delete button 996.

Navigatable Preview

As noted previously, the preview portion of the CDUIs are navigatable. Selection of a message or a button in a preview portion may cause the editor portion to be updated to include UI elements for editing the selected message or a message pointed to by (or associated with) the selected button. For example, a user/designer selecting message 772 causes CDUI 1000 to be displayed. CDUI 1000 is similar to CDUI 400, except that button section 1030 indicates that the message corresponding to button 1074 is complete while button section 1040 indicates that the message corresponding to button 1076 is incomplete. For example, text for button 1074 have been entered and an action for button 1074 has been selected. However, an action for button 1076 has not been selected. Thus, button 1076 in preview portion 1070 is highlighted a different color (e.g., red) than the colors of other UI elements in preview portion 1070. Such a highlight indicates that button 1076 or a message corresponding to button 1076 is not yet complete.

Also, button section 1040 includes (1) a warning 1046 that the message corresponding to button 1076 is empty and (2) edit next message invitation 1048. User selection of edit next message invitation 1048 or of button 1076 causes CDUI 1100 to be displayed.

CDUI 1100 is similar to CDUI 1000 except that editor portion 1110 does not include any button section and preview portion 1170 includes a new message 1188, which is a child of introduction message 1172. Also, button 1176 (which corresponds to button 1076) is no longer highlighted a color that indicates that message text is missing from new message 1188. In this example, editor portion 1110 includes a message section 1120 that includes a text input field 1122 for inserting text that will be used to update "child" message 1188. Initially, text input field 1122 is empty, but CDUI 1100 indicates that a user has entered text in text input field 1122, which causes the same text to appear in message 1188.

CDUI 1100, similar to other CDUIs, includes a previous button link 1102. Selection of previous button link 1102 or of introduction message 1172 causes CDUI 1100 to be updated to be CDUI 1200. CDUI 1200 is similar to CDUI 1000, except that button section 1240 does not include a warning, similar to warning 1046 since the text of message 1188 is complete or filled in. Also, introduction message 1272 is highlighted because the UI elements in editor portion 1210 are for editing introduction message 1272. Selection of button 1274 or of edit next message invitation 1238 causes CDUI 1200 to be updated to CDUI 1300.

Editor portion 1310 of CDUI 1300 includes a message section 1320 for editing child message 1378 and button sections 1330 and 1340 for editing buttons 1380-1382, respectively. Preview portion 1370 includes introduction message 1372 and message 1378. User selection of button 1380 causes CDUI 1300 to be updated to CDUI 1400.

Editor portion 1410 of CDUI 1400 includes a message section 1420 for editing grandchild message 1484. Editor portion 1410 does not include any button section because message 1484 does not include any buttons. User selection of button 1480 causes CDUI 1400 to be updated to CDUI 1500.

CDUI 1500 is similar to CDUI 1400 except editor portion 1510 of CDUI 1500 includes a message section 1520 for editing grandchild message 1586. Editor portion 1510 does not include any button section because message 1586 does not include any buttons.

Validations

As described previously, content delivery system 120 includes a validator (not depicted) that validates one or more aspects of a conversation tree that a user or representative of a content provider constructs using one or more conversation design user interfaces.

Example validations include determining whether any message is empty, determining whether any button does not include a text description, determining whether any button is not associated with an action, and determining whether the conversation tree only includes one message. If any of these determinations results in the affirmatively, then a warning is displayed. The warning may be displayed in one or more locations in a conversation design user interface.

Figure 16:
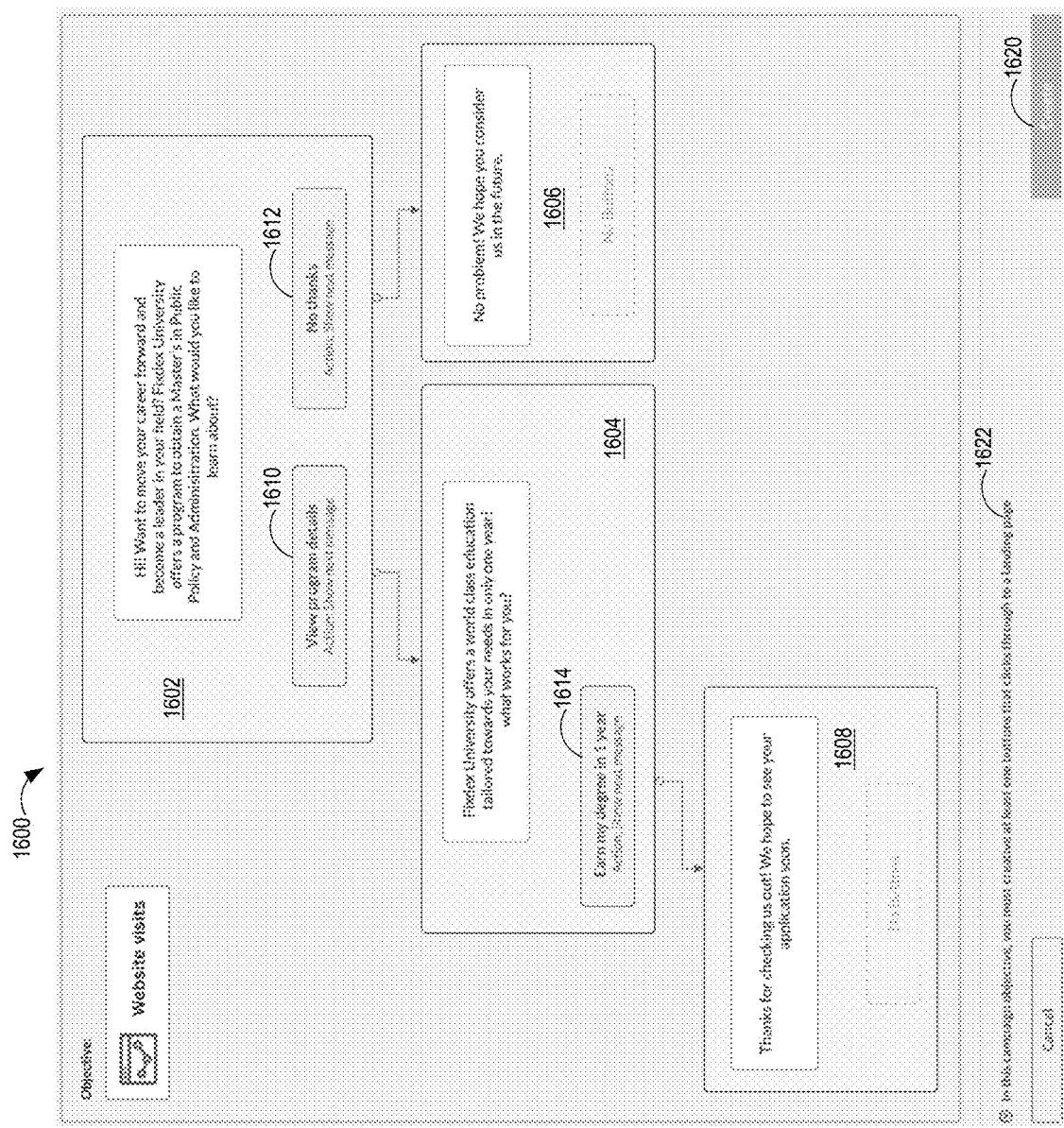
FIGS. 16 and 17A-17C are example conversation trees that depict warnings in response to validations, in an embodiment.

Another class of validations is related to a campaign's objective. Content delivery system 120 determines whether a conversation tree includes a button action that is associated with the campaign's objective. For example, if a content delivery campaign's objective is visiting a particular website and content delivery system 120 determines that none of the buttons in the conversation tree is associated with a URL that links to a website, then a warning is displayed. FIG. 16 is a block diagram that depicts an example conversation tree 1600 that includes four messages 1602-1608 and three buttons 1610-1614, in an embodiment. Conversation tree 1600 may be presented to a user/designer that wishes to view the conversation tree all at once. Alternatively, conversation tree 1600 is a logical representation of the underlying digital data that makes up conversation tree 1600. The block diagram includes a create button 1620 that, if selected, causes conversation tree 1600 to be formally submitted and, optionally, to be ready for content delivery to end-users by content delivery system 120. However, in an embodiment, create button 1620 (or another create button that is displayed in a CDUI) is disabled (which may be visually depicted through shading) if it is determined that none of the buttons in conversation tree 1600 is associated with a particular objective that was selected previously for this content delivery campaign, which objective in this example is website visits. A website visit objective means that at least one item in the conversation should include a link to a third-party website. Also, a textual warning, such as warning 1622, may be displayed that notifies the user/designer about the lack of such a URL.

Figure 17A:
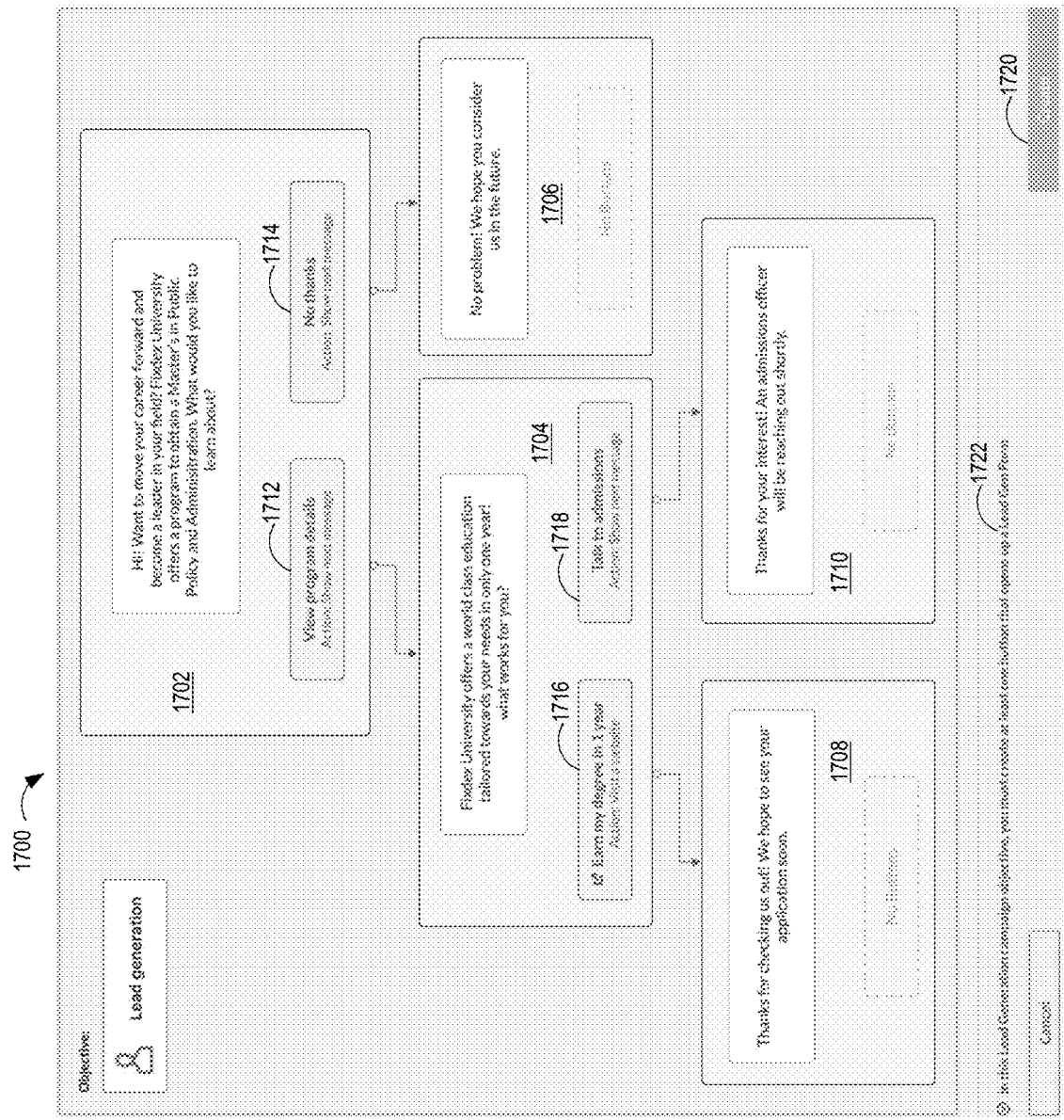

As another example, if a content delivery campaign's objective is filling out a lead generation form and content delivery system 120 determines that none of the buttons in the conversation tree is associated with a lead generation form, then a warning is displayed. FIG. 17A is a block diagram that depicts an example conversation tree 1700 that includes five messages 1702-1712 and four buttons 1714-1720. Conversation tree 1700 may be presented to a user/designer that wishes to view the conversation tree all at once. Alternatively, conversation tree 1700 is a logical representation of the underlying digital data that makes up conversation tree 1700. The block diagram includes a create button 1722 that, if selected, causes conversation tree 1700 to be formally submitted and, optionally, to be ready for content delivery to end-users by content delivery system 120. However, in an embodiment, create button 1722 (or another create button that is displayed in a CDUI) is disabled if it is determined that none of the buttons in conversation tree 1700 is associated with a lead generation form. Also, a textual warning, such as warning 1724 may be displayed that notifies the user/designer about the lack of a lead generation form.

Figure 17B:
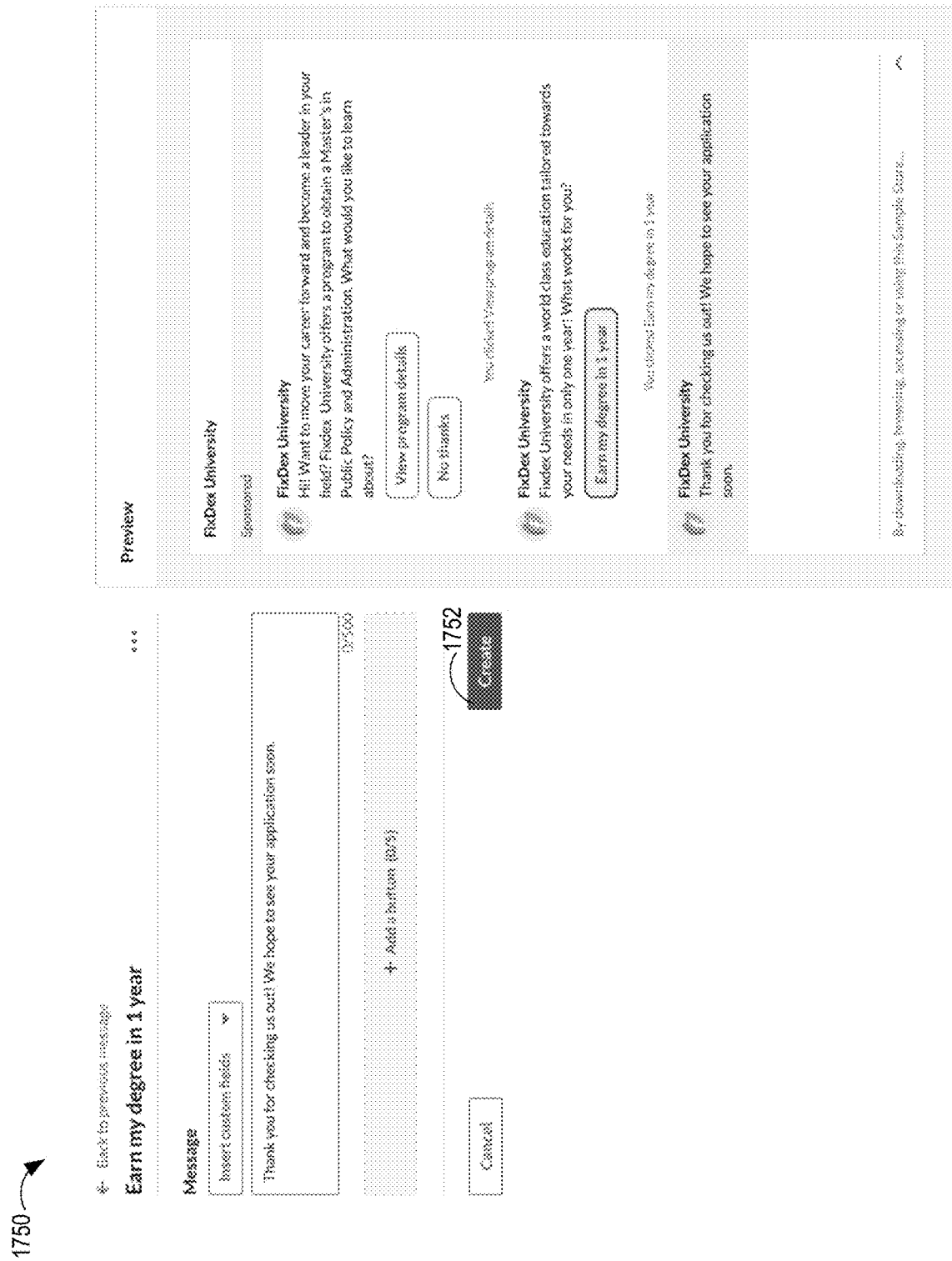
Figure 17C:
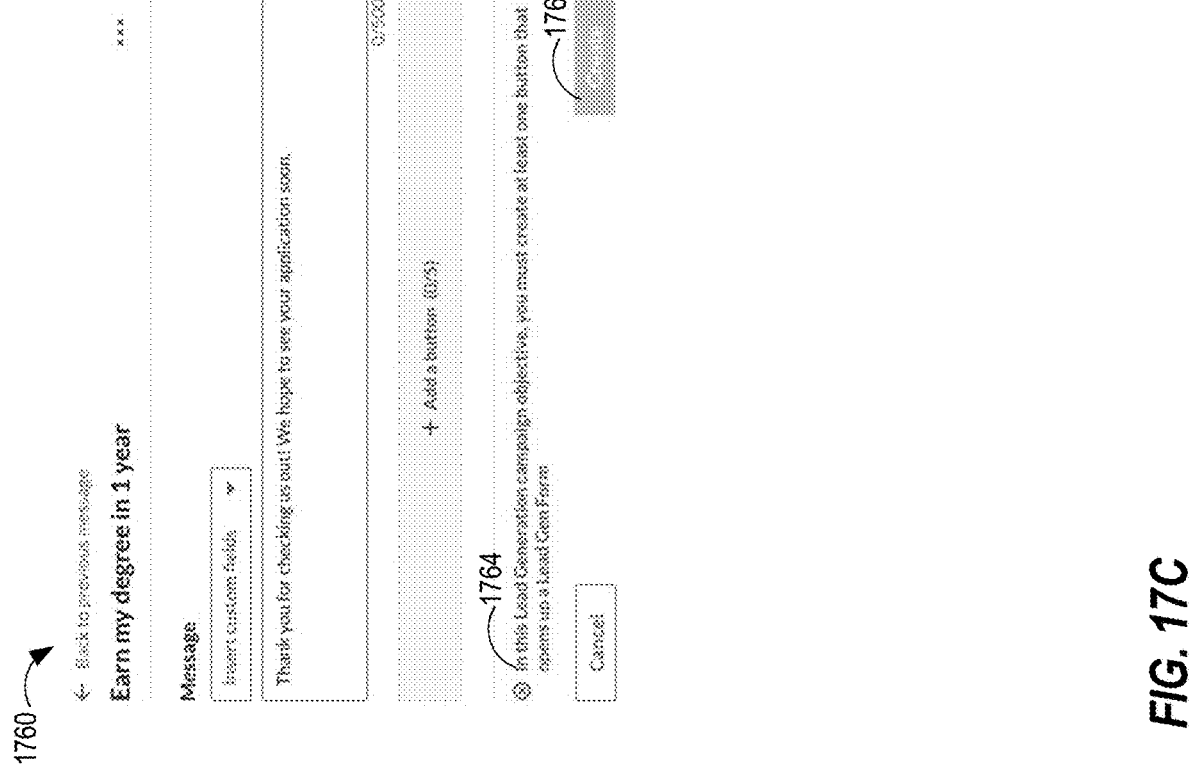

FIG. 17B is a screenshot of a CDUI 1750 where an objective that was previously selected was lead generation. CDUI 1750 includes a create button 1752, selection of which causes CDUI 1750 to be updated to CDUI 1760, as depicted in FIG. 17C, if content delivery system 120 determines that a lead generation form was not linked to, or added to, the corresponding conversation tree. The create button 1762 of CDUI 1760 is faded, indicating that create button 1762 is disabled. CDUI 1760 also includes a warning 1764 about the lack of a button that links to a lead generation form.

Process Overview for Navigatable Buttons

FIG. 18 is a flow diagram that depicts an example process 1800 for updating a conversation design user interface, in an embodiment. Process 1800 may be performed by content delivery system 120 through content provider interface 122.

At block 1810, a conversation design user interface (CDUI) is displayed. The CDUI includes an editor portion and a preview portion, similar to the CDUIs described previously. The CDUI may be displayed in response to user operating a client device and selecting or inputting a URL of content delivery system 120 into a search interface of a web browser. Alternatively, the CDUI is displayed in a native application that executes on the client device and is configured to communicate with content delivery system 120 over a network (e.g., the Internet).

The editor portion of the CDUI includes a first set of UI elements for creating and editing one message at a time. Each created message is automatically included in a conversation tree. The preview portion of the CDUI includes a first strict subset of a set of messages that has (already) been created for the conversation tree. The first strict subset includes a first message that comprises multiple buttons. Thus, multiple user inputs may have been received in block 1810 in order to reach the state where multiple messages have been created for the conversation tree. Alternatively, the conversation tree may have been created in a different (prior) user session and then, during a current user session, content delivery system 120 retrieves the conversation tree from storage and displays the tree on the client device in response to a request from the client device, whether from a native application or a web application.

At block 1820, first input is received through the CDUI that selects a first button in the first message. For example, using a cursor control, the user selects the first button. As another example, given a touchscreen on the client device, the user places his/her finger on a portion of the touchscreen where the first button is displayed.

At block 1830, in response to receiving the first input, the preview portion is updated to include a second strict subset of the set of messages, which second strict subset is different than the first strict subset. Block 1830 may involve determining that the first button is associated with, or points to, a second message that is not currently displayed in the preview portion. Thus, the second message is then displayed in the preview portion. However, the first message may still remain in the preview portion, especially if the first message is an immediate "parent" of the second message.

In some scenarios, the first message is not the "root" message in the conversation tree. In those scenarios, any "ancestor" messages of the first message remain in the preview portion.

In some scenarios, the updated preview portion (which includes the second strict subset) contains fewer messages than the previous instance of the preview portion (which included the first strict subset). In those scenarios, the first message is at least a grandparent (or may be a great grandparent) of the bottom most message in the previous preview portion.

At block 1840, in response to receiving the first input, the editor portion is updated to include a set of UI elements for editing the second message that is associated with the first button. Block 1840 may involve identifying content, associated with the second message, that has been stored in association with the second message previously. Such content may include a text description and an indication of zero or more buttons. If one or more buttons have been previously created for the second message, then attributes or content of those button(s) may also be displayed. For example, a name of a button is displayed in the editor portion along with an action for that button.

At block 1850, second input is received that selects an add button option presented in the editor portion. For example, using a cursor control, the user places the digital cursor over the add button option in the display and presses a button. As another example, given a touchscreen on the client device, the user places his/her finger on a portion of the touchscreen where the add button option is displayed.

At block 1860, in response to receiving the second input, the editor portion is updated to include a set of UI elements for creating a button for the second message. If the second message already includes one or more buttons, then UI elements for editing those one or more buttons may remain in the editor portion (and not change location in response to the second input).

At block 1870, in response to receiving the second input, the preview portion is updated to include the button in the second message.

Although process 1800 includes multiple blocks, some embodiments may exclude one or more of these blocks. For example, an embodiment may involve only blocks 1810-1830.

Process Overview for Updating Preview Portion

FIG. 19 is a flow diagram that depicts an example process 1900 for updating a conversation design user interface, in an embodiment. Process 1900 may be performed by content delivery system 120 through content provider interface 122.

At block 1910, a conversation design user interface (CDUI) is presented that comprises an editor portion and a preview portion. The preview portion includes a preview of multiple messages that have been created for a conversation tree through the CDUI. The messages include a first message and second message that is a child of the first message.

At block 1920, input is received through the CDUI that selects the first message. For example, the first message, in the preview portion, is a user selectable element that triggers an action.

At block 1930, in response to receiving the input, the preview portion is updated to exclude the second message, while retaining the first message. If the preview portion included any "ancestor" messages of the first message prior to the update, then the preview portion may retain those ancestor messages.

At block 1940, in response to receiving the input, the editor portion is updated to include information about the first message. Previously, before the input, the editor portion may have included information about the second message. However, the updated version may exclude the information about the second message. The editor portion also includes UI elements for editing the first message, such as modifying text in the first message, adding buttons to the first message, deleting buttons of the first message, modifying text of a button of the first message, and adding a link to a button of the first message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
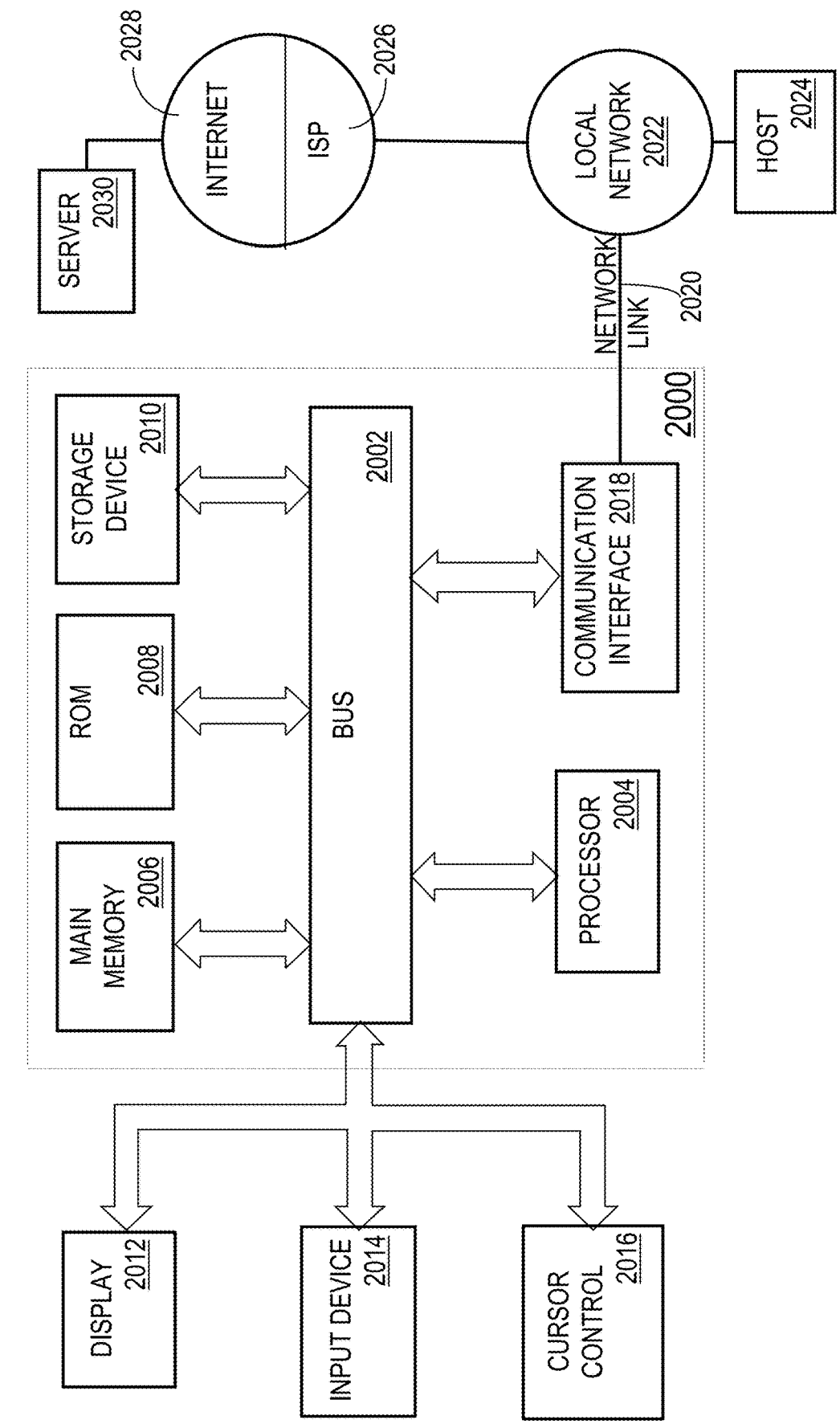
FIG. 20 is a block diagram that illustrates a computer system upon which an embodiment of the invention may be implemented.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or solid-state drive is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2010. Volatile media includes dynamic memory, such as main memory 2006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   causing a user interface to be displayed that comprises an editor portion and a preview portion that is separate from the editor portion;
   wherein the editor portion includes a first set of elements for creating and editing messages in a conversation tree that comprises a plurality of messages that includes a certain message that is associated with a plurality of child messages, each child message being associated with a different button in the certain message;
   wherein the preview portion includes a first strict subset, of the plurality of messages, that includes a first message that comprises a plurality of buttons;
   receiving, through the user interface, input that selects a first button of the first message;
   in response to receiving the input, causing the preview portion to be updated to include a second strict subset, of the plurality of messages, that is different than the first strict subset;
   wherein the method is performed by one or more computing devices.

2. The method of claim 1, wherein the second strict subset includes the first message and one or more messages that are not included in the first strict subset.

3. The method of claim 1, wherein:
   the first strict subset also includes a second message that includes a second button that is associated with the first message;
   the second strict subset includes the second message.

4. The method of claim 1, wherein the second strict subset includes less messages than the first strict subset.

5. The method of claim 1, further comprising:
   in response to receiving the input, causing the editor portion to be displayed to include a second set of elements for editing a second message that is associated with the first button.

6. The method of claim 5, further comprising:
   receiving second input that selects an add button option in the editor portion;
   in response to receiving the second input:
   updating the editor portion to include a third set of elements for creating a second button for the second message;
   updating the preview portion to include the second button.

7. The method of claim 1, wherein the editor portion includes a second set of elements for creating a button, wherein the second set of elements includes:
   a text field for entering a name of the button, and
   an action selection option that is associated with a plurality of selectable actions.

8. The method of claim 7, further comprising:
   receiving second input that selects a particular selectable action, of the plurality of selectable actions, that is associated with linking to a third-party website;
   in response to receiving the second input, causing a URL field to be displayed that allows a content provider to insert a URL for associating with the button;
   receiving text within the URL field;
   in response to receiving the text, associating the text with the button.

9. The method of claim 1, further comprising:
   in response to receiving second input that indicates that a user is finished creating the conversation tree, determining whether the conversation tree is complete;
   in response to determining that the conversation tree is not complete, causing the editor portion to be updated to highlight one or more portions of the conversation tree that are not complete;
   wherein the one or more portions include a button that does not include text or an action or a message that does not include text.

10. The method of claim 1, further comprising:
    receiving second input to delete a particular message or a particular button in the particular message;
    in response to receiving the second input, deleting one or more child messages of the particular message.

11. A method comprising:
    causing a user interface to be displayed that comprises an editor portion and a preview portion that is separate from the editor portion;
    wherein the editor portion includes a first set of elements for creating and editing messages in a conversation tree that comprises a plurality of messages;
    wherein the preview portion includes a first strict subset, of the plurality of messages, that includes a first message and a second message that is a child of the first message;
    receiving, through the user interface, input that selects the first message;
    in response to receiving the input:
    causing the preview portion to be updated to exclude the second message and retain the first message;
    causing the editor portion to be updated to include information about the first message;
    wherein the method is performed by one or more computing devices.

12. One or more storage media storing instructions which, when executed by one or more processors, cause:
    causing a user interface to be displayed that comprises an editor portion and a preview portion that is separate from the editor portion;
    wherein the editor portion includes a first set of elements for creating and editing messages in a conversation tree that comprises a plurality of messages that includes a certain message that is associated with a plurality of child messages, each child message being associated with a different button in the certain message;

wherein the preview portion includes a first strict subset, of the plurality of messages, that includes a first message that comprises a plurality of buttons;

receiving, through the user interface, input that selects a first button of the first message;

in response to receiving the input, causing the preview portion to be updated to include a second strict subset, of the plurality of messages, that is different than the first strict subset.

13. The one or more storage media of claim 12, wherein the second strict subset includes the first message and one or more messages that are not included in the first strict subset.

14. The one or more storage media of claim 12, wherein the second strict subset includes less messages than the first strict subset.

15. The one or more storage media of claim 12, wherein the instructions, when executed by the one or more processors, further cause:

in response to receiving the input, causing the editor portion to be displayed to include a second set of elements for editing a second message that is associated with the first button.

16. The one or more storage media of claim 15, wherein the instructions, when executed by the one or more processors, further cause:

receiving second input that selects an add button option in the editor portion;

in response to receiving the second input:

updating the editor portion to include a third set of elements for creating a second button for the second message;

updating the preview portion to include the second button.

17. The one or more storage media of claim 12, wherein the editor portion includes a second set of elements for creating a button, wherein the second set of elements includes:

a text field for entering a name of the button, and an action selection option that is associated with a plurality of selectable actions.

18. The one or more storage media of claim 17, wherein the instructions, when executed by the one or more processors, further cause:

receiving second input that selects a particular selectable action, of the plurality of selectable actions, that is associated with linking to a third-party website;

in response to receiving the second input, causing a URL field to be displayed that allows a content provider to insert a URL for associating with the button;

receiving text within the URL field;

in response to receiving the text, associating the text with the button.

19. The one or more storage media of claim 12, wherein the instructions, when executed by the one or more processors, further cause:

in response to receiving second input that indicates that a user is finished creating the conversation tree, determining whether the conversation tree is complete;

in response to determining that the conversation tree is not complete, causing the editor portion to be updated to highlight one or more portions of the conversation tree that are not complete;

wherein the one or more portions include a button that does not include text or an action or a message that does not include text.

20. The one or more storage media of claim 12, wherein the instructions, when executed by the one or more processors, further cause:

receiving second input to delete a particular message or a particular button in the particular message;

in response to receiving the second input, deleting one or more child messages of the particular message.

* * * * *